United States Patent
Thompson, Jr. et al.

(10) Patent No.: US 9,464,527 B2
(45) Date of Patent: Oct. 11, 2016

(54) FUEL-COOLED BLADED ROTOR OF A GAS TURBINE ENGINE

(71) Applicant: WILLIAMS INTERNATIONAL CO., L.L.C., Walled Lake, MI (US)

(72) Inventors: Robert S. Thompson, Jr., White Lake, MI (US); Gregg G. Williams, Walled Lake, MI (US); David W. Jarrell, Commerce Township, MI (US); Curtis E. Lynch, Commerce Township, MI (US); Mark E. Suchezky, South Lyon, MI (US)

(73) Assignee: Williams International Co., LLC, Walled Lake, MI (US)

( * ) Notice: Subject to any disclaimer, the term of this patent is extended or adjusted under 35 U.S.C. 154(b) by 357 days.

(21) Appl. No.: 14/212,158

(22) Filed: Mar. 14, 2014

(65) Prior Publication Data

US 2014/0193274 A1    Jul. 10, 2014

Related U.S. Application Data

(63) Continuation-in-part of application No. 12/937,213, filed as application No. PCT/US2009/040130 on Apr. 9, 2009, now Pat. No. 8,820,092.

(60) Provisional application No. 61/798,028, filed on Mar. 15, 2013, provisional application No. 61/043,726, filed on Apr. 9, 2008.

(51) Int. Cl.
```
F02C 7/16     (2006.01)
F01D 5/18     (2006.01)
F01D 9/06     (2006.01)
F02C 3/14     (2006.01)
F02C 7/224    (2006.01)
```

(52) U.S. Cl.
CPC .............. *F01D 5/185* (2013.01); *F01D 9/065* (2013.01); *F02C 3/14* (2013.01); *F02C 7/16* (2013.01); *F02C 7/224* (2013.01); *F05D 2260/207* (2013.01); *Y02T 50/676* (2013.01)

(58) Field of Classification Search
CPC ............ F23R 3/38; F23R 3/30; F01D 5/185; F01D 9/065; F02C 7/16; F02C 7/224
USPC ................... 60/745, 806, 730; 416/97 R, 96; 415/115, 116, 169.1
See application file for complete search history.

(56) References Cited

U.S. PATENT DOCUMENTS 2,479,777 A    8/1949  Price
2,647,368 A    8/1953  Treibbnigg et al.
(Continued)

*Primary Examiner* — Christopher Besler
(74) *Attorney, Agent, or Firm* — Raggio & Dinnin, P.C.

(57) ABSTRACT

Liquid fuel from a rotary fluid trap is atomized by a sharp edge on an inside surface of an aft cavity of a bladed rotor of a gas turbine engine and directed into each of a plurality of associated hollow blades through corresponding blade inlet ducts that are in fluid communication with corresponding aft hollow interior portions of each blade. A radially-extending central rib within each blade partitions the hollow interior thereof into aft and forward hollow interior portions that are in fluid communication through an associated opening in the central rib and through a radially-extending gap between the central rib and the interior surface of the blade. A blade outlet duct provides for fluid communication between the forward hollow interior portion and a forward cavity of the bladed rotor, and a rotor outlet duct provides for discharging the fuel from a radially-inboard portion of the forward cavity.

36 Claims, 17 Drawing Sheets

(56) References Cited

U.S. PATENT DOCUMENTS

| | | |
|---|---|---|
| 2,667,326 A | 1/1954 | Max |
| 2,778,601 A | 1/1957 | Eckert |
| 2,779,565 A | 1/1957 | Bruckmann |
| 2,783,613 A | 3/1957 | Von Zborowski |
| 2,849,210 A | 8/1958 | Turunen et al. |
| 2,866,313 A | 12/1958 | Holl |
| 2,883,151 A | 4/1959 | Dolida |
| 2,945,671 A | 7/1960 | Petrie |
| 2,981,066 A | 4/1961 | Johnson |
| 3,355,883 A | 12/1967 | Beam, Jr. |
| 3,550,372 A | 12/1970 | Craig |
| 3,600,890 A | 8/1971 | White et al. |
| 3,734,639 A | 5/1973 | Short |
| 3,756,020 A | 9/1973 | Moskowitz et al. |
| 3,902,819 A | 9/1975 | Holchendler et al. |
| 4,134,709 A | 1/1979 | Eskesen |
| 4,156,582 A | 5/1979 | Anderson |
| 4,179,240 A | 12/1979 | Kothmann |
| 4,190,398 A | 2/1980 | Corsmeier et al. |
| 4,259,037 A | 3/1981 | Anderson |
| 4,260,336 A | 4/1981 | Johnson |
| 4,338,780 A | 7/1982 | Sakamoto et al. |
| 4,350,473 A | 9/1982 | Dakin |
| 4,769,996 A | 9/1988 | Barbeau |
| 4,845,941 A | 7/1989 | Paul |
| 4,870,825 A | 10/1989 | Chapman |
| 5,003,766 A | 4/1991 | Paul |
| 5,122,033 A | 6/1992 | Paul |
| 5,125,793 A | 6/1992 | MacArthur et al. |
| 5,177,954 A | 1/1993 | Paul |
| 5,224,713 A | 7/1993 | Pope |
| 5,299,418 A | 4/1994 | Kerrebrock |
| 5,341,636 A | 8/1994 | Paul |
| 5,568,984 A | 10/1996 | Williams |
| 5,695,319 A | 12/1997 | Matsumoto et al. |
| 5,795,130 A | 8/1998 | Suenaga et al. |
| 5,857,836 A | 1/1999 | Stickler et al. |
| 5,993,155 A | 11/1999 | Endres et al. |
| 6,094,905 A | 8/2000 | Fukuyama |
| 6,192,670 B1 | 2/2001 | Kerrebrock |
| 6,195,979 B1 | 3/2001 | Fukuyama |
| 6,267,553 B1 | 7/2001 | Burge |
| 6,351,938 B1 | 3/2002 | Kerrebrock |
| 6,357,217 B1 | 3/2002 | Griffin |
| 6,381,945 B2 | 5/2002 | Werner |
| 6,554,570 B2 | 4/2003 | Dailey |
| 6,672,075 B1 | 1/2004 | Sandu et al. |
| 6,925,812 B2 | 8/2005 | Condevaux et al. |
| 6,988,367 B2 | 1/2006 | Thompson Jr. et al. |
| 8,057,163 B2 | 11/2011 | Thompson, Jr. et al. |
| 8,763,405 B2 | 7/2014 | Sordyl et al. |
| 8,820,092 B2 | 9/2014 | Thompson, Jr. et al. |
| 2005/0039463 A1 | 2/2005 | Condevaux et al. |
| 2005/0229601 A1 | 10/2005 | Thompson, Jr. et al. |
| 2009/0019853 A1 | 1/2009 | Nilsson |

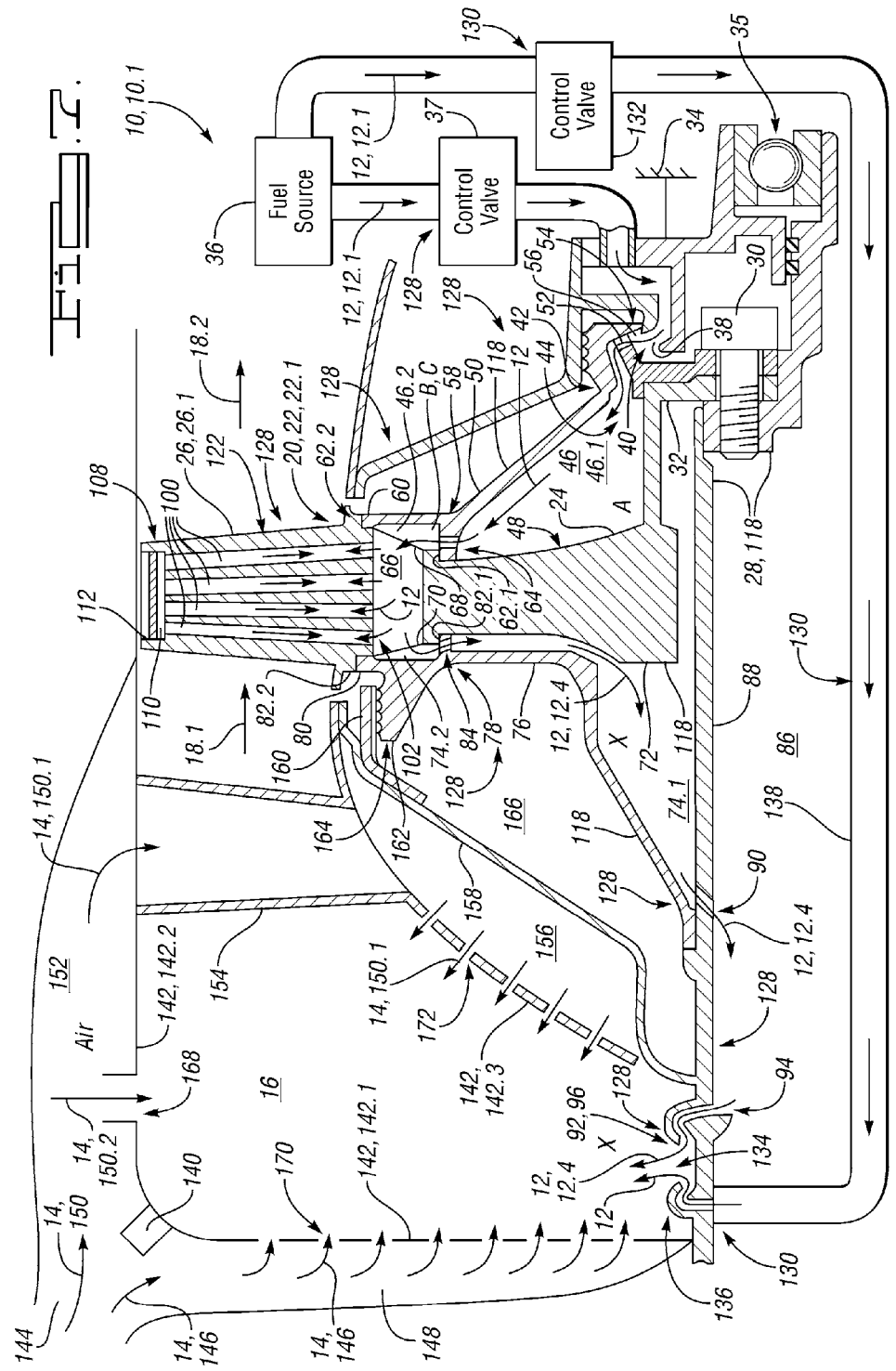

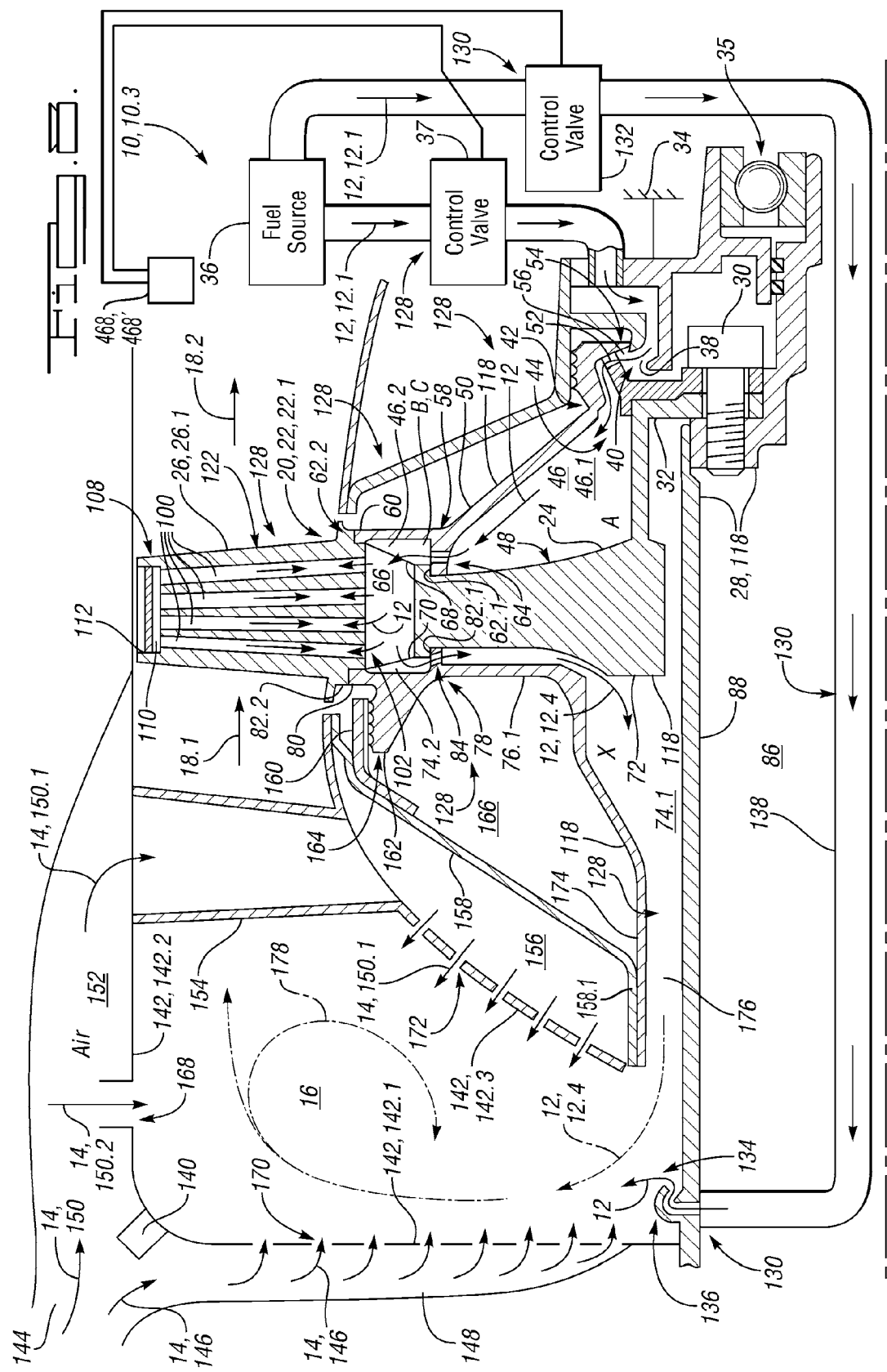

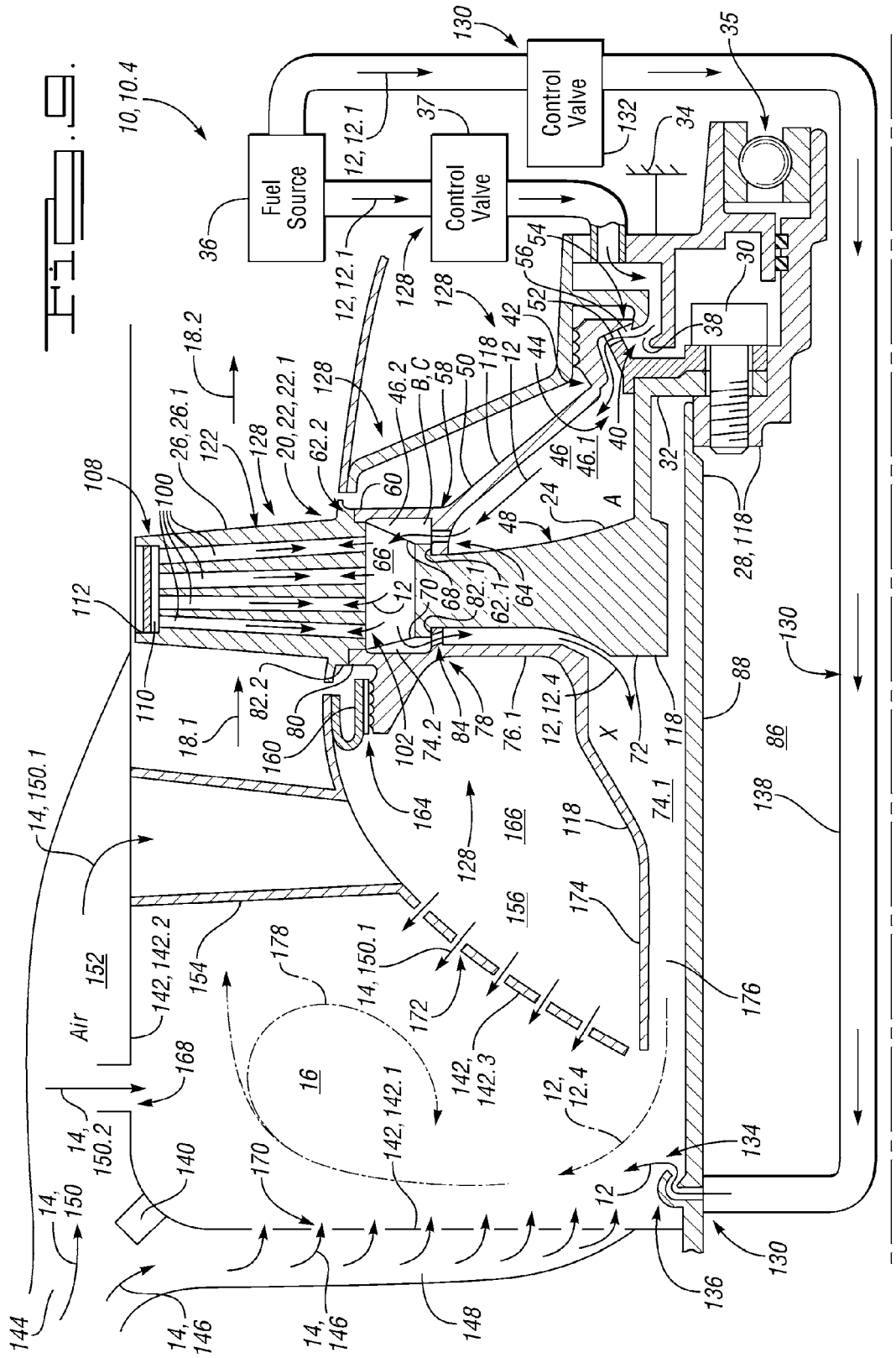

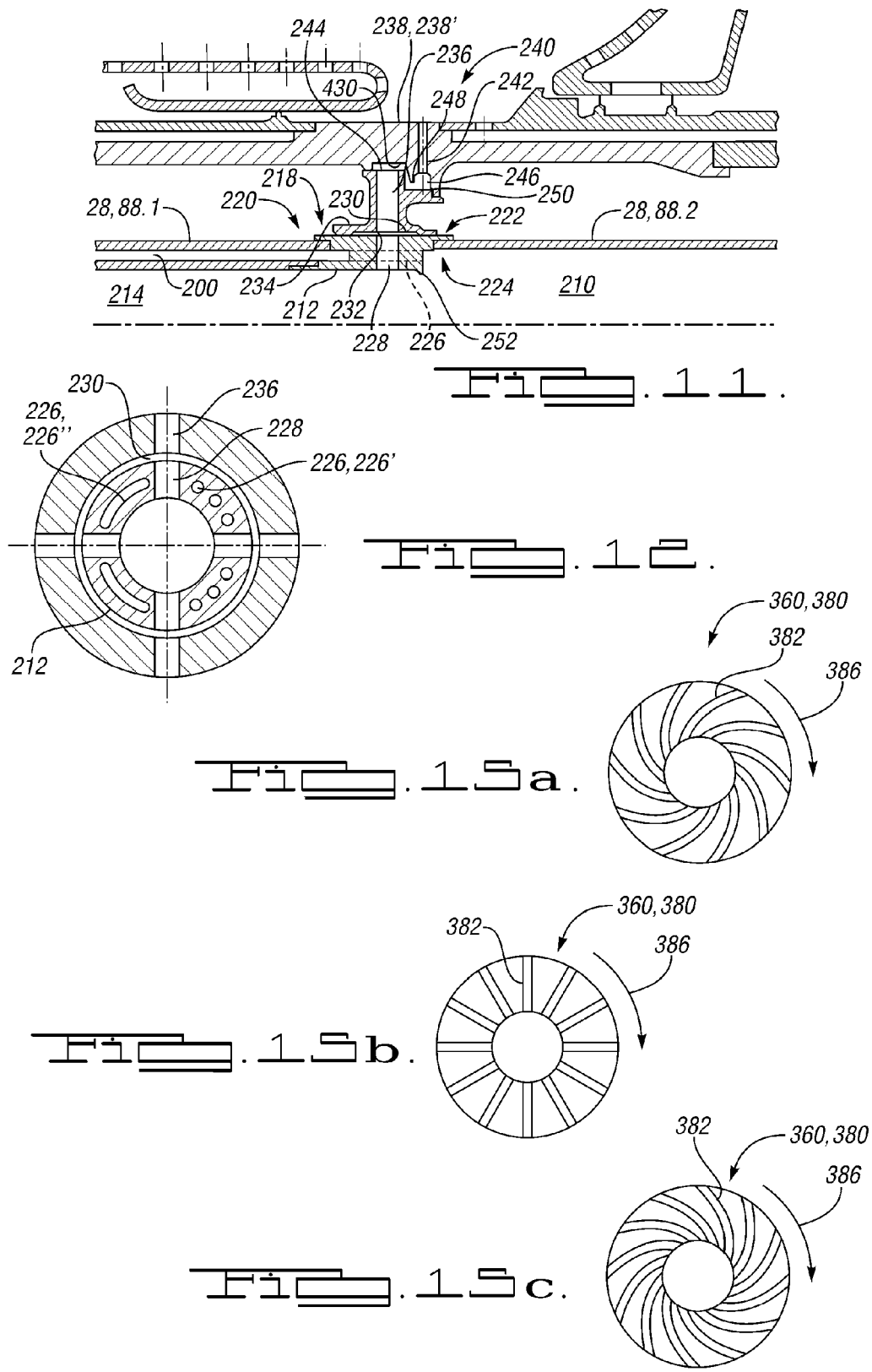

FUEL-COOLED BLADED ROTOR OF A GAS TURBINE ENGINE

CROSS-REFERENCE TO RELATED APPLICATIONS

The instant application is a continuation-in-part of U.S. application Ser. No. 12/937,213 filed on 8 Oct. 2010 under 35 U.S.C. §371 as the U.S. national stage of International Application No. PCT/US2009/040130 filed on 9 Apr. 2009, which claims the benefit of U.S. Provisional Application Ser. No. 61/043,726 filed on 9 Apr. 2008. The instant application also claims benefit of U.S. Provisional Application Ser. No. 61/798,028 filed on 15 Mar. 2013. Each of the above-identified applications is incorporated herein by reference in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. F33615-03-D-2412/0004 awarded by the United States Air Force Research Laboratory (AFRL).

BRIEF DESCRIPTION OF THE DRAWINGS

In the accompanying drawings:

FIG. 6 illustrates a cross-sectional view of a second embodiment of a gas turbine engine incorporating a system for cooling a turbine rotor and associated blades thereof;

FIG. 7 illustrates a second mode of operation of the first embodiment of the gas turbine engine;

FIG. 8 illustrates a cross-sectional view of a third embodiment of a gas turbine engine incorporating a system for cooling the turbine rotor and the associated blades thereof;

FIG. 9 illustrates a cross-sectional view of a fourth embodiment of a gas turbine engine incorporating a system for cooling the turbine rotor and the associated blades thereof;

FIG. 11 illustrates an expanded fragmentary cross-sectional view of a portion of the fifth embodiment of the gas turbine engine illustrated in FIG. 10 associated with an injection of fuel and air into the associated combustion chamber;

FIG. 12 illustrates a radial cross-sectional view of a portion of the fifth embodiment of the gas turbine engine illustrated in FIG. 11 associated with a distribution of fuel flow therein;

FIGS. 15a, 15b and 15c illustrate various embodiments of a vane portion of a front cover that cooperates with the associated turbine rotor of the fifth embodiment of the gas turbine engine illustrated in FIG. 10 so as to provide for imposing a forced vortex flow of fuel radially inward therealong during operation of the gas turbine engine.

DESCRIPTION OF EMBODIMENT(S)

Figure 1:
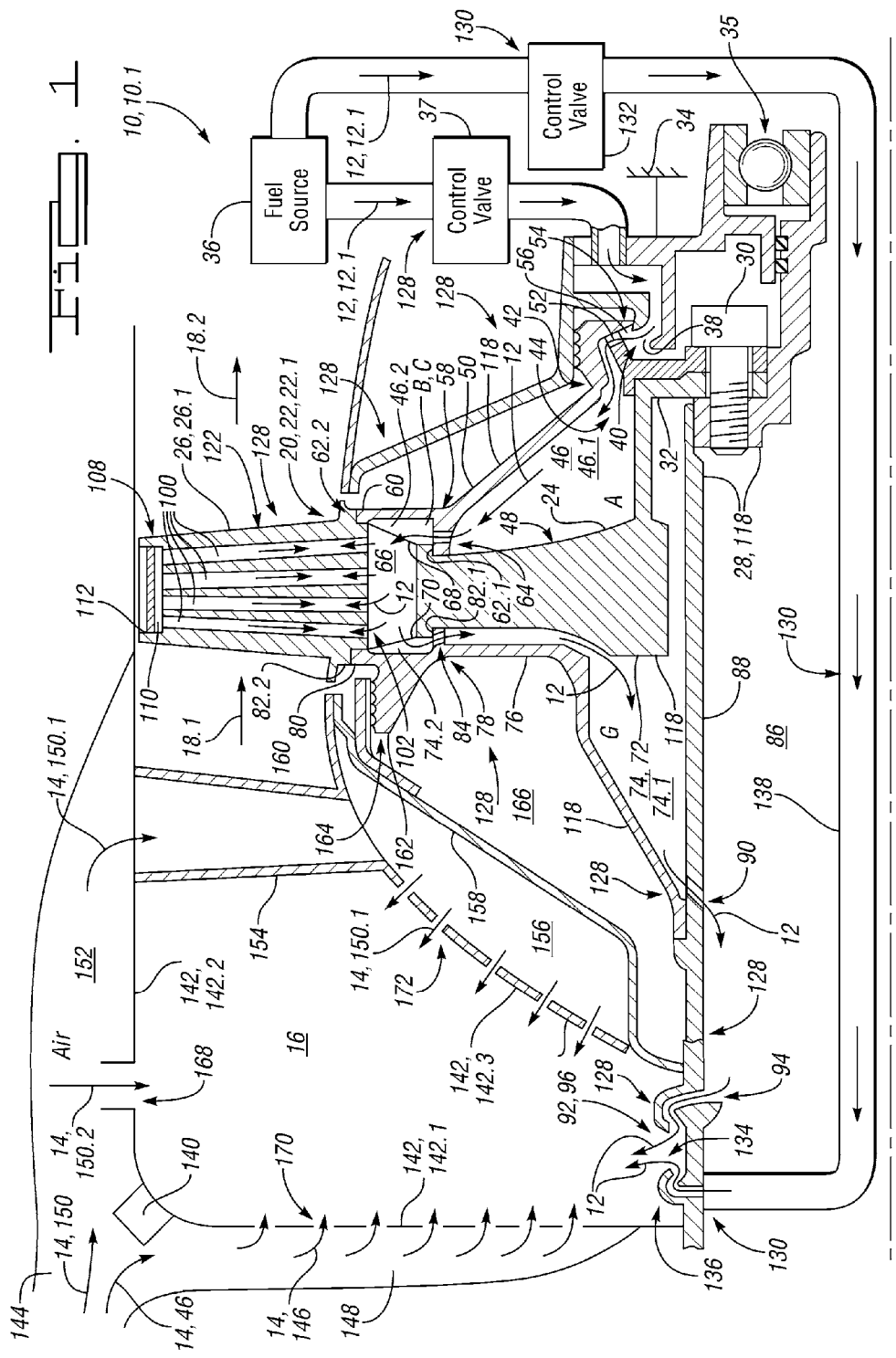
FIG. 1 illustrates a cross-sectional view of a first embodiment of a gas turbine engine incorporating a system for cooling a turbine rotor and associated blades thereof.

Referring to FIG. 1, in a gas turbine engine 10, 10.1, fuel 12 and air 14 are combusted in a combustion chamber 16 so as to generate relatively hot, relatively high pressure exhaust gases 18.1 which are directed through a turbine 20 comprising a bladed rotor 22, 22.1, e.g. a rotor 24 incorporating a plurality of blades 26, 26.1 on the periphery thereof. The turbine 20 is operatively coupled to a shaft assembly 28, e.g. with a bolt 30 through an associated flange 32, and the shaft assembly 28 is supported from the housing 34 of the gas turbine engine 10, 10.1 by one or more bearings 35 that provide for rotation of the shaft assembly 28 and turbine 20 relative thereto. The action of the exhaust gases 18.1 against the blades 26, 26.1 rotates the turbine 20 and the shaft assembly 28, which, for example, is operatively coupled to a compressor (not illustrated) that provides for pumping the air 14 into the combustion chamber 16. The exhaust gases 18.2 discharged from the turbine 20 are at a relatively lower pressure than the exhaust gases 18.1 upstream thereof as a result of the work done thereby on the turbine 20.

Under some conditions, for example, when operated as a turbo jet engine to propel a high-speed aircraft at high Mach numbers, the air 14 supplied to the gas turbine engine 10, 10.1 is relatively hot, which contributes to increased temperature of the exhaust gases 18.1, and which is not sufficiently cool to otherwise provide for adequately cooling the turbine 20, so that the temperature of the associated blades 26, 26.1 can become excessively high if not otherwise cooled. Under these conditions, the fuel 12 is generally sufficiently cool to provide sufficient cooling capacity to cool the gas turbine engine 10, 10.1, and particularly, to cool the turbine 20 thereof, which might otherwise be susceptible to thermally induced failure, whereby the gas turbine engine 10, 10.1 is cooled by directing fuel 12 from a source of fuel 36 through the rotor 24 and blades 26, 26.1 of the turbine 20 to cool the rotor 24 and the blades 26, 26.1 of the turbine 20, and then combusting this fuel 12—preheated by the cooling process—in the combustion chamber 16.

For example, fuel 12 from a source of fuel 36 comprising a fuel tank and an associated fuel pump is supplied through a first control valve 37 to an orifice 38 that is relatively fixed with respect to the housing 34 of the gas turbine engine 10, 10.1. The fuel 12 is discharged from the orifice 38 into an inlet 40 of a first rotary fluid trap 42 operatively coupled to the rotor 24 so as to rotate therewith. The outlet 44 of the first rotary fluid trap 42 is in fluid communication with a first portion 46.1 of a first aft cavity 46 that is bounded by a portion of an aft side 48 of the rotor 24 and by a forward surface of an aft cover 50, of which the first rotary fluid trap 42 is a part.

The first rotary fluid trap 42 comprises a passage 52, constituting a trap portion, that provides for fluid communication between the inlet 40 and the outlet 44, wherein, in accordance with the teachings of U.S. Pat. Nos. 4,870,825, 6,269,647, 6,925,812 and 6,988,367, each of which is incorporated herein by reference, and, as explained more fully hereinbelow, the passage 52 is adapted so that when the first rotary fluid trap 42 is rotated, a centrifugal acceleration at any point within the passage 52 is greater than a centrifugal acceleration at any point on either the inlet 40 or the outlet 44 of the first rotary fluid trap 42. Accordingly, when the rotating passage 52 is filled with a relatively high density medium, such as liquid fuel 12.1, the radial levels of the inlet 40 and outlet 44 will be equal when there is no pressure differential therebetween, and will be otherwise unequal by an amount dependent upon the magnitude of the pressure differential and the speed of rotation. For a relatively low pressure supply of liquid fuel 12.1 to an inlet 40 of a passage 52 feeding a relatively high pressure region at the outlet 44, at a sufficient speed of rotation, the passage 52 can prevent backflow therethrough. Accordingly, the first rotary fluid trap 42 provides for isolating the pressure in the first aft cavity 46—which can be relatively high—from the pressure at the inlet 40 of the passage 52—which is relatively lower—thereby providing for supplying fuel 12 to the inlet 40 of the first rotary fluid trap 42 across a rotary junction 54 between the rotating inlet 40 and the relatively fixed orifice 38, whereby liquid fuel 12.1 sprayed from the relatively fixed orifice 38 becomes captured by an internal trough 56 associated with the inlet 40 of the first rotary fluid trap 42 as a result of centrifugal acceleration acting upon the liquid fuel 12.1 upon striking the internal trough 56 and rotating therewith.

Figure 2:
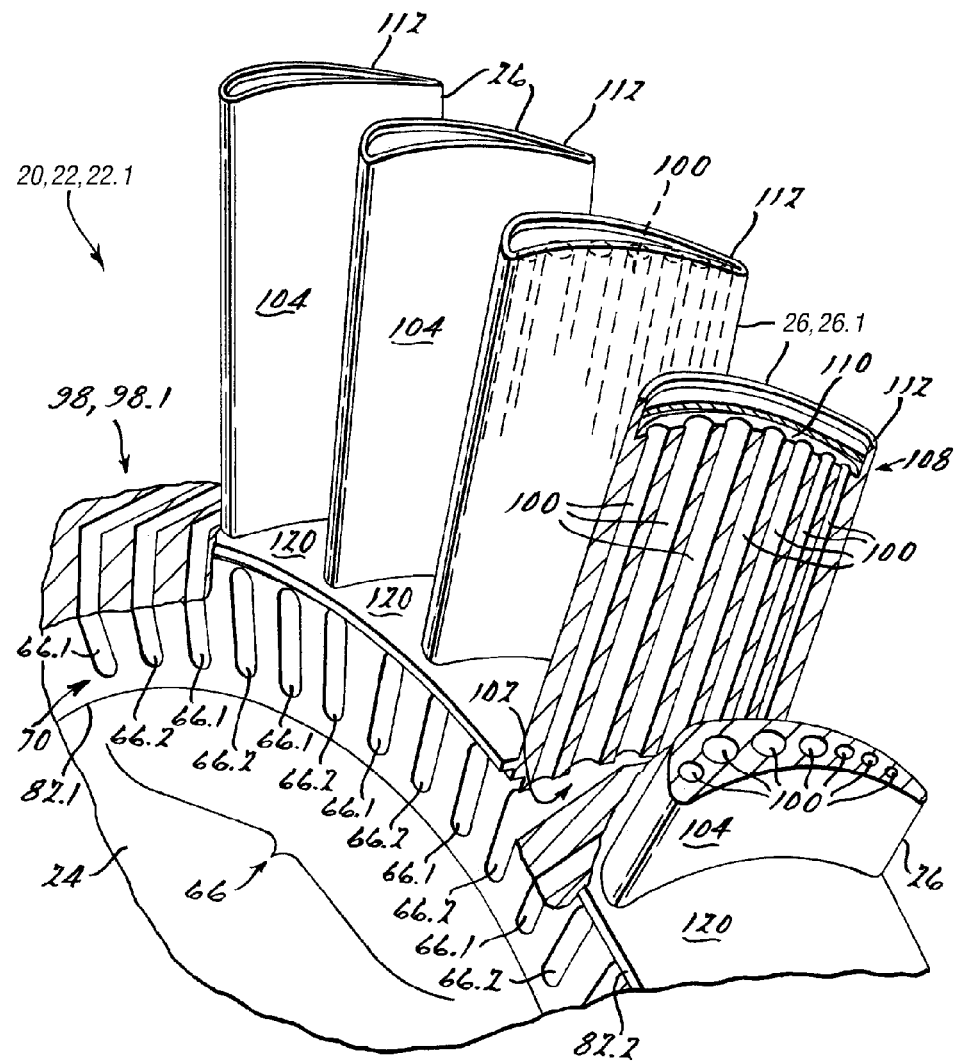
FIG. 2 illustrates an isometric view of a portion of a first embodiment of a bladed rotor and associated fragmentary sectional views thereof.

The aft cover 50 comprises an intermediate rim 58 and an outer rim 60 that engage respective first 62.1 and second 62.2 lips formed on the aft side 48 of the rotor 24. The outer rim 60 is sealed to the second lip 62.2 so as to prevent leakage of fuel 12 from the joint therebetween. The intermediate rim 58 incorporates at least one passage 64 that provides for fluid communication between first 46.1 and second 46.2 portions of the first aft cavity 46. The second portion 46.2 of the first aft cavity 46 is in fluid communication with a plurality of first passages 66 that extend through the rotor 24. Referring also to FIG. 2, each first passage 66 has a first opening 68 on the aft side 48 of the rotor 24, and a second opening 70 on a forward side 72 of the rotor 24, the aft 48 and forward 72 sides being opposite to one another.

The first passages 66 are in fluid communication with a second portion 74.2 of a first forward cavity 74 that is bounded by a portion of the forward side 72 of the rotor 24 and by an aft surface of a forward cover 76, wherein the forward cover 76 comprises an intermediate rim 78 and an outer rim 80 that engage respective first 82.1 and second 82.2 lips formed on the forward side 72 of the rotor 24. The outer rim 80 is sealed to the second lip 82.2 so as to prevent leakage of fuel 12 from the joint therebetween. The intermediate rim 78 incorporates at least one passage 84 that provides for fluid communication between the second portion 74.2 of the first forward cavity 74 and a first portion 74.1 thereof. In accordance with a first embodiment of the gas turbine engine 10, 10.1 as illustrated in FIG. 1, the first portion 74.1 of the first forward cavity 74 is in fluid communication with the interior 86 of a shaft 88 of the shaft assembly 28 via at least one passage 90 extending through the wall of the shaft 88, and the interior 86 of the shaft 88 is in fluid communication with at least one first discharge orifice 92 through at least one other passage 94 through the shaft 88. The first discharge orifice 92 is in fluid communication with the combustion chamber 16, and thereby provides for a discharge of fuel 12 directly from the rotating shaft 88 to the combustion chamber 16. The first discharge orifice 92 is, for example, a part of a second rotary fluid trap 96 that provides for isolating the relatively high pressure of the combustion chamber 16 from the relatively lower pressure of the interior of the shaft 88 and the first portion 74.1 of the first forward cavity 74, whereby the principles of structure and operation of the second rotary fluid trap 96 are the same as those of the first rotary fluid trap 42 described hereinabove.

Figure 5:
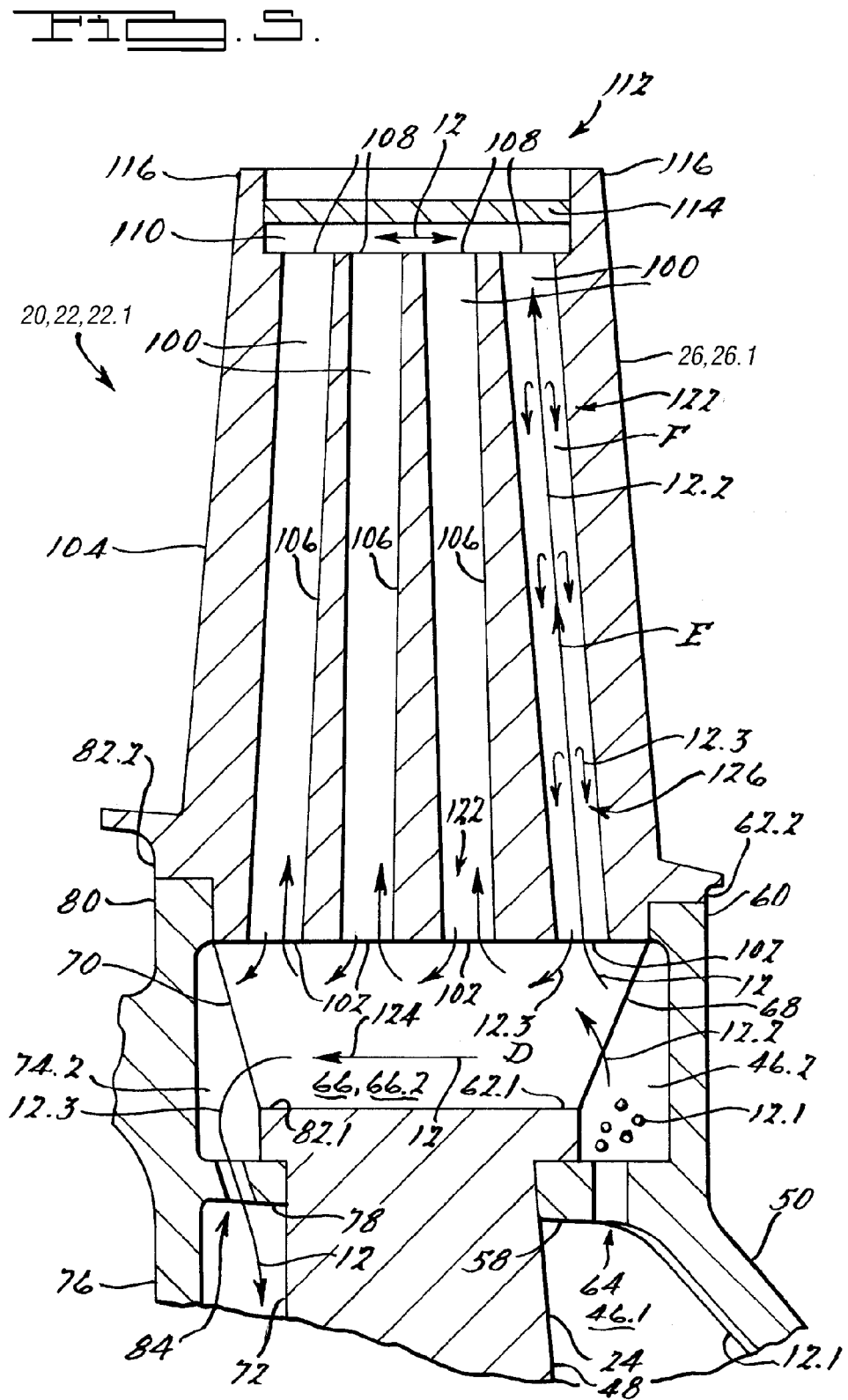
FIG. 5 illustrates a cross-sectional view of a portion of the first embodiment of the bladed rotor and an associated thermosiphon process therein.
Figure 5:
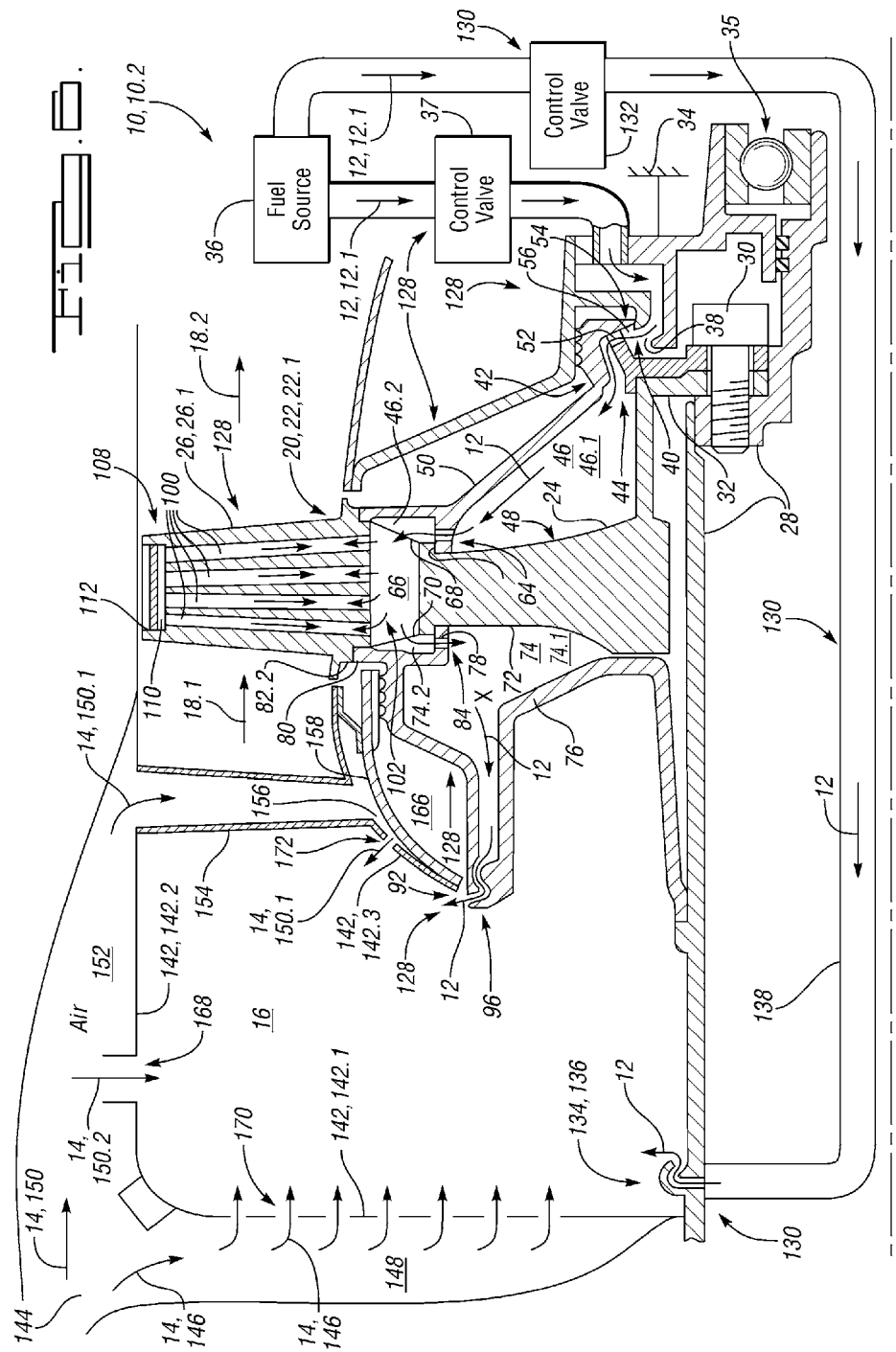

Referring to FIGS. 2 and 5, illustrating a first embodiment of a bladed rotor 22, 22.1, the first passages 66 and associated first 68 and second 70 openings are substantially uniform in size and shape, and uniformly distributed so as to provide a mechanically balanced rotor 24. The axial shape 98 of the first passages 66 is adapted to at least partially conform to a profile of the associated blades 26, 26.1. For example, in the embodiment illustrated in FIG. 2, the first passages 66 have chevron axial shape 98.1 so as to at least partially conform to the camber of the blades 26, 26.1. A first set 66.1 of first passages 66 extend through the rotor 24 at associated circumferential locations that are substantially between the associated circumferential locations of the associated blades 26, 26.1, and a second set 66.2 of first passages 66 extend through the rotor 24 at associated circumferential locations that are substantially aligned with the associated circumferential locations of the associated blades 26, 26.1, whereby the first 66.1 and second 66.2 sets of first passages 66 are interleaved with respect to one another. Each of the blades 26, 26.1 incorporates a plurality of second passages 100 that extend substantially radially therewithin, each of which at a first end 102 thereof intersects an associated first passage 66 of the second set 66.2 that is aligned therewith. For example, the second passages 100 are substantially linear along the length thereof. As illustrated in FIG. 2, the diameter of the second passages 100 within a particular blade 26, 26.1 can be adapted in accordance with the associated blade thickness proximate thereto, so as to provide sufficient heat transfer between the outer surface 104 of the blade 26, 26.1 and the surface 106 of the associated second passage 100 while providing for adequate blade strength. The distal second ends 108 of the second passages 100 are terminated in a third cavity 110 proximate to a tip 112 of the blade 26, wherein the third cavity 110 provides for fluid communication amongst the second passages 100 within the associated blade 26. For example, the third cavity 110 is formed by an end cap 114 that is separated from the second ends 108 of the second passages 100, and which is secured at its periphery to the edge 116 of the blade 26. The blades 26, 26.1 are closed with respect to the combustion chamber 16 relative to the fuel 12 within the blades 26, 26.1, so that all of the fuel 12 enters the combustion chamber 16 at a location that is radially inward of the blades 26, 26.1.

Accordingly, the gas turbine engine 10, 10.1 comprises a rotatable portion 118 that is rotatable with respect to a housing 34 of the gas turbine engine 10, 10.1, wherein the rotatable portion 118 comprises the turbine 20/bladed rotor 22, 22.1, comprising the rotor 24 and the blades 26, 26.1; the aft cover 50 and associated first rotary fluid trap 42; the forward cover 76; and the shaft assembly 28/shaft 88 and associated first discharge orifice 92/second rotary fluid trap 96, all of which rotate in unison with a rotating frame of reference. After discharge from the relatively fixed orifice 38, the fuel 12 is contained within the rotatable portion 118 until discharge directly into the combustion chamber 16 from the first discharge orifice 92 of the rotatable portion 118 in the rotating frame of reference Accordingly, because all of the elements of the rotatable portion 118 rotate in unison with the rotating frame of reference, these elements can be readily sealed to one another as necessary to contain the fuel 12 therein, for example, at the junctions of the outer rims 60, 80 of the aft 50 and forward 76 covers with the second lips 62.2, 82.2 of the rotor 24, which could otherwise be problematic if it were necessary to provide for sealing across a relatively moving junction of elements to be sealed to one another.

With the gas turbine engine 10, 10.1 in operation, liquid fuel 12.1 provided by the source of fuel 36 and regulated by the first control valve 37 is discharged from the relatively fixed orifice 38 into the internal trough 56 of the inlet 40 of the first rotary fluid trap 42. The discharged liquid fuel 12.1 is captured by the internal trough 56 as a result of the centrifugal acceleration acting upon the discharged liquid fuel 12.1 which commences rotation with the rotatable portion 118 upon impact with the internal trough 56 or the liquid fuel 12.1 contained therein. Liquid fuel 12.1 entering the inlet 40 of the first rotary fluid trap 42 is pumped through the associated passage 52 of the first rotary fluid trap 42 by the action of centrifugal acceleration forces acting upon the liquid fuel 12.1 contained within the first rotary fluid trap 42, and this action of centrifugal acceleration forces also isolates the relatively low pressure at the inlet 40 of the first rotary fluid trap 42 from a relatively high pressure at the outlet 44 thereof. Upon exiting the outlet 44 of the first rotary fluid trap 42, the fuel 12 is accelerated radially outwards, whereby liquid fuel 12.1—which is relatively dense in comparison with associated fuel vapor—tends to follow the inside surface of the aft cover 50.

Figure 3:
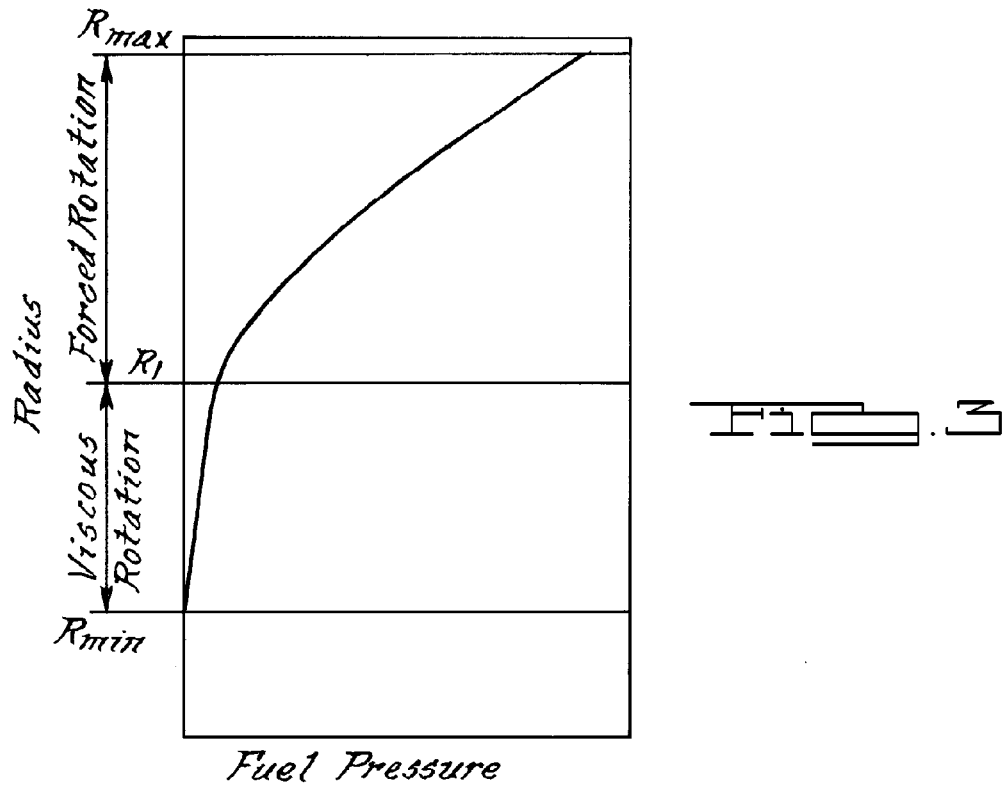
FIG. 3 illustrates a diagram of the relationship between fuel pressure and radial location within the bladed rotor of the gas turbine engine illustrated in FIG. 1.
Figure 4:
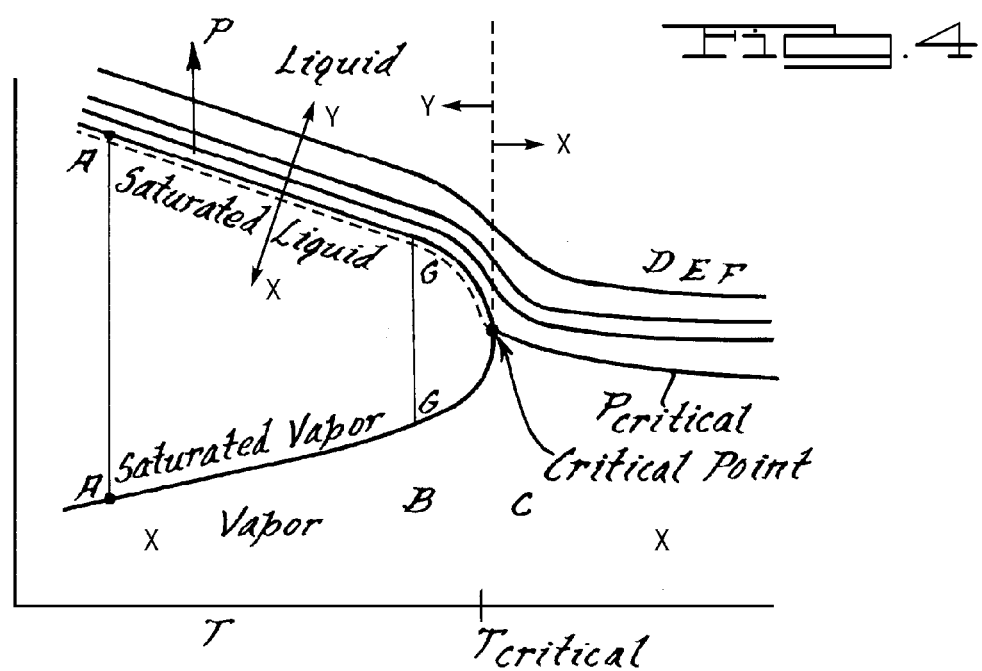
FIG. 4 illustrates a diagram of the density and state of fuel as a function of temperature and pressure.

During normal operation of the gas turbine engine 10, 10.1, the hottest portion of the turbine 20/bladed rotor 22, 22.1 are the blades 26, 26.1 which are directly exposed to the relatively hot exhaust gases 18.1 from the combustion chamber 16. Heat from the blades 26, 26.1 is transferred to the rotor 24 and associated aft 50 and forward 76 covers, which provides for heating any fuel 12 in the associated first aft 46 and first forward 74 cavities that are adjacent to the aft 48 and forward 72 sides of the rotor 24. Accordingly, the temperature of the rotor 24 and the adjacent aft cover 50 increases with decreasing distance from the blades 26, 26.1, so that fuel 12 within the first aft cavity 46 is heated as it flows radially outwards. Furthermore, referring to FIG. 3, the centrifugal acceleration acting upon the fuel 12 increases with increasing radial distance within the first aft cavity 46, which increases the associated pressure thereof. Fuel 12 in the first aft 46 or first forward 74 cavities is rotated by viscous forces generated as a result of relative motion of the rotor 24 and aft cover 50 acting with respect to the liquid or vapors in the associated first aft 46 or first forward 74 cavities, whereas fuel 12 in the first 66 or second 100 passages is forced to rotate with the rotor 24 and blades 26, 26.1. Accordingly, as illustrated in FIG. 3, in the former region of viscous rotation, the fuel pressure increases at a lower rate with respect to radial distance than in the latter forced region because of slippage within the flow stream than can occur in the former region but not in the latter. Referring to FIG. 4, as the fuel 12 is heated in the first portion 46.1 of the first aft cavity 46, the fuel 12 is transformed from a saturated liquid to a saturated vapor, as indicated by the locus of points labeled "A", which is also shown in FIG. 1. As the fuel 12 flows from the first 46.1 to the second portion 46.2 of the first aft cavity 46, the fuel 12 becomes superheated, and may exhibit a mixture of states as indicated by the points labeled "B" and "C" in FIGS. 1 and 4.

As the fuel 12 flows through the first opening 68 into the first passage 66, it becomes further heated and pressurized. Fuel 12 in the first set 66.1 of first passages 66 flows therethrough, out of the second openings 70 thereof, and then into the second portion 74.2 of the first forward cavity 74, and in the process, provides for cooling the rim 120 of the rotor 24 in the regions between the blades 26, 26.1. Referring to FIG. 5, the centrifugal acceleration field causes relatively dense fuel 12 in the second set 66.2 of first passages 66 to flow into the second passages 100 intersecting therewith, which displaces fuel 12 therein that has become relatively more heated and less dense, responsive to a thermosiphon process that is driven by the centrifugal acceleration field and by the decrease in density as fuel 12 becomes heated as a result of heat transfer from the blades 26, 26.1 which cools the blades 26, 26.1. The thermosiphon flow 122 within the second passages 100 and between the first 66 and second 100 passages causes a continuous exchange of relatively cooler fuel 12.2 for relatively hotter fuel 12.3, which is also illustrated by the points "D", "E" and "F" in FIGS. 4 and 5. The relatively hotter fuel 12.3 ultimately flows through the second opening 70 of the second set 66.2 of first passages 66 and into the second portion 74.2 of the second cavity. The second set 66.2 of first passages 66 provides for the flow of fuel 12 either directly therethrough from the first opening 68 to the second opening 70 along a first flow path 124, which provides for cooling the rotor 24 at the base of the associated blade 26; or indirectly after first flowing along a second flow path 126 which includes one or more second passages 100 responsive to a thermosiphon process, which provides for cooling the associated blade 26, 26.1 of the turbine 20.

The relatively less dense heated fuel 12.3 in the second portion 74.2 of the first forward cavity 74 flows through the passage 84 into the first portion 74.1 of the first forward cavity 74 after being displaced by relatively more dense less heated fuel 12 from the first passages 66. As the fuel flows radially inwards in the first forward cavity 74, the pressure thereof is reduced, and the fuel 12 is cooled by exchange of heat with the relatively cooler surroundings, transforming from a superheated vapor to a saturated vapor then a saturated liquid, as indicated by the locus of points labeled "G" on FIG. 4 corresponding to the location similarly labeled in FIG. 1. The fuel 12 then flows through the passage 90 through the shaft 88, through the interior 86 of the shaft 88, out of a second passage through the shaft 88 and into the combustion chamber 16 through the first discharge orifice 92 which is part of a second rotary fluid trap 96.

The above-described system and method of cooling the turbine 20—wherein fuel 12 is delivered by a first fuel distribution circuit 128 from the source of fuel 36 through the first control valve 37 to the rotor 24 and blades 26, 26.1—is beneficially used when the turbine 20 is at a temperature that is sufficient to vaporize the fuel 12 so as to mitigate against disrupting the mechanical balance of the turbine 20. In accordance with another aspect, it is beneficial to utilize a second fuel distribution circuit 130 that provides for injecting fuel directly into the combustion chamber 16 without involving flow through the rotor 24 and blades 26, 26.1. Referring to FIG. 1, liquid fuel 12.1 supplied from the source of fuel 36 is regulated by a second control valve 132 and delivered to a second discharge orifice 134, for example, a part of a third rotary fluid trap 136, for example, operatively coupled to the shaft 88, wherein fuel 12 is supplied from the second control valve 132 through a separate passage 138 in the interior of the shaft 88. For example, the first 37 and second 132 control valves would be controlled so that all of the fuel 12 to the gas turbine engine 10, 10.1 is delivered by the second fuel distribution circuit 130 during startup and warm-up conditions. After the gas turbine engine 10, 10.1 has warmed up, in one embodiment, the second fuel distribution circuit 130 provides for a sufficient amount of fuel 12 to maintain an idle operating condition, and the remaining fuel 12 is provided by the first control valve 37 via the first fuel distribution circuit 128 responsive to operationally dependent demand. In another embodiment, all of the fuel 12 might be delivered by the first fuel distribution circuit 128 after the gas turbine engine 10, 10.1 has warmed up. In yet another embodiment, some other relative distribution of fuel 12 between the first 128 and second 130 fuel distribution circuits is used, for example, with the proportion of fuel 12 delivered by the first fuel distribution circuit 128 to the total fuel 12 delivered being from zero to one hundred percent. For example, in one embodiment, about five percent of the total fuel 12 is delivered by the first fuel distribution circuit 128. In addition to providing for cooling the blades 26, 26.1 and rotor 24 of the turbine 20, the first fuel distribution circuit 128 also provides for a regenerative recovery of heat from the exhaust gases 18.1 so as to provide for improved operating efficiency, particularly for stationary applications.

The gas turbine engine 10, 10.1 may incorporate an igniter 140 in cooperation with the combustion chamber 16, so as to provide for igniting the mixture of air 14 and fuel 12 therein, wherein the fuel 12 may be delivered by either the first 128 or second 130 fuel distribution circuit, or both the first 128 and second 130 fuel distribution circuits.

Referring again to FIG. 1, the combustion chamber 16 is adapted to receive air 14 both upstream and downstream of the first 92 and second 134 discharge orifices, which provides for cooling the walls 142 of the combustion chamber 16, and which mixes with and provides for the combustion of the liquid fuel 12.1 sprayed from the one or more first discharge orifices 92. More particularly, air 14 (also known as CDP air, i.e. Compressor Discharge Pressure air) is supplied to a first annular plenum 144 by a compressor (not illustrated) of the gas turbine engine 10, 10.1. The flow of air 14 from the first annular plenum 144 is bifurcated, a first portion 146 flowing into a second annular plenum 148 located adjacent to a forward wall 142.1 of the combustion chamber 16, and the remaining second portion 150 flowing into a third annular plenum 152 radially adjacent to an outer circumferential wall 142.2 of the combustion chamber 16. At least a portion 150.1 of the second portion 150 of air 14 in the third annular plenum 152 flows through the interior of a hollow vane 154 extending across a downstream portion of the combustion chamber 16, and into a fourth annular plenum 156 adjacent to an aft wall 142.3 of the combustion chamber 16. The fourth annular plenum 156 is bounded by the aft wall 142.3 of the combustion chamber 16 and by an inner shroud 158, wherein the inner shroud 158 is adapted with a cylindrical rim 160, the inner surface of which cooperates a plurality of channels in an outer surface of a forward-extending rim 162 that depends from the rotor 24, and from which depends a first labyrinth sealing element 164 that provides for preventing the intrusion of exhaust gases 18.1 into a second forward cavity 166 between the inner shroud 158 and the forward cover 76. The exterior of the hollow vane 154, located upstream of the turbine 20, provides for guiding or straightening exhaust gases 18.1 flowing thereby into the turbine 20. In some embodiments, the outer circumferential wall 142.2 of the combustion chamber 16 is adapted with one or more orifices 168, for example, effusion cooling holes, that provide for a remaining portion 150.2 of the second portion 150 of air 14 in the third annular plenum 152 to flow generally radially inward directly into the combustion chamber 16. The forward wall 142.1 of the combustion chamber 16 is adapted with one or more orifices 170, for example, effusion cooling holes, that provide for the first portion 146 of air 14 to flow from the second annular plenum 148 into the combustion chamber 16. The aft wall 142.3 of the combustion chamber 16 is adapted with one or more orifices 172, for example, effusion cooling holes, that provide for the portion 150.1 of the second portion 150 of air 14 to flow from the fourth annular plenum 156 into the combustion chamber 16. As used herein, the term annular is intended to mean that which comprises at least a portion of an associated annulus or an approximation thereof, for example, at least one circumferential segment of an annulus, or that which has a cross-section that corresponds to that of a corresponding annulus.

Referring to FIG. 6, in accordance with a second embodiment of a gas turbine engine 10, 10.2, the first discharge orifice 92 and associated second rotary fluid trap 96 are incorporated in, or depend from, the forward cover 76, so as to provide for injection of fuel 12 directly into the combustion chamber 16 therefrom, without involving the shaft 88 as an associated flow path. The elements illustrated in FIG. 6 otherwise correspond in both structure and operation to like-numbered elements illustrated in FIG. 1.

Referring to FIG. 7, in accordance with a second mode of operation, the first embodiment of the gas turbine engine 10, 10.1 may be operated at a sufficient level of power, and with associated sufficient levels of temperature in the associated exhaust gases 18.1, such that the fuel 12, 12.4 flowing radially inwards into the first portion 74.1 of the first forward cavity 74, and thereafter until injection into the combustion chamber 16, is in a gaseous or vapor state, e.g. as indicted by the locus of points labeled "X" on FIG. 4, for which either the pressure at a given temperature is less than that of the "saturated liquid" boundary, or for which the temperature is greater than the critical temperature. Under such conditions, the second rotary fluid trap 96 would not provide for isolating the pressure of the combustion chamber 16 from the interior 86 of the shaft 88, and from the remaining passages and cavities downstream of the first rotary fluid trap 42 in fluid communication therewith. Accordingly, under such conditions, the associated passages and cavities downstream of the first rotary fluid trap 42 would need to be designed to withstand the associated pressures resulting when the pressure at the inlet of the second rotary fluid trap 96, if present, was not isolated thereby from the pressure of the combustion chamber 16, wherein the pressure within the bladed rotor 22, 22.1 or blades 26, 26.1 increases with radial distance responsive to the associated affects of centrifugal acceleration.

Similarly, the second embodiment of a gas turbine engine 10, 10.2 may be operated in accordance with the second mode of operation wherein the fuel 12 is discharged from the first discharge orifice 92 in a gaseous or vapor state, so that the second rotary fluid trap 96 would not provide for more than insubstantially isolating the pressure at the inlet thereof from the that of the combustion chamber 16. Accordingly, under the second mode of operation of the gas turbine engine 10, 10.1, 10.2, the second rotary fluid trap 96 could be eliminated because a gas or vapor flowing therethrough would not provide for the isolation of pressures thereacross during operation thereof.

Referring to FIG. 8, in accordance with a third embodiment of a gas turbine engine 10, 10.3, the associated forward cover 76.1 is adapted to provide for discharging fuel 12, 12.4 in a gaseous or vapor state directly into the combustion chamber 16 therefrom, for example, adjacent to the external surface of the shaft 88. More particularly, the forward cover 76.1, rather than being terminated on the shaft 88 as in the embodiments illustrated in FIGS. 1, 6 and 7, incorporates a cylindrical extension 174 that in cooperation with the outside of the shaft 88 defines an annular duct 176 that provides for the first portion 74.1 of the first forward cavity 74 to be in fluid communication therethrough with the combustion chamber 16, wherein the associated inner shroud 158.1 is adapted so as to provide for the cylindrical extension 174 and the associated annular duct 176 to extend therethrough. Accordingly, in operation, the annular duct 176 provides for discharging fuel 12, 12.4—preheated to a gaseous or vapor state by the cooling therewith of the bladed rotor 22, 22.1,—directly into the combustion chamber 16, rather than using the interior 86 of the shaft 88 as a conduit. The fuel 12, 12.4 discharged in a forward direction into the combustion chamber 16 from the annular duct 176 mixes with the first 146 and second 150 portions of air 14 injected from the orifices 168, 170, 172 through the walls 142 of the combustion chamber 16, which is adapted to provide for a circulation 178 therein of the resulting fuel/air mixture. The elements illustrated in FIG. 8 otherwise correspond in both structure and operation to like-numbered elements illustrated in FIG. 7.

Referring to FIG. 9, in accordance with a fourth embodiment of a gas turbine engine 10, 10.4, the forward cover 76.1 is adapted similar to that in the third embodiment of the gas turbine engine 10, 10.3 illustrated in FIG. 8, so as to provide for discharging fuel 12, 12.4 in a gaseous or vapor state directly into the combustion chamber 16 therefrom. However, in the fourth embodiment, the fourth annular plenum 156 is bounded by the aft wall 142.3 of the combustion chamber 16 and by the forward surface of the forward cover 76.1, the latter of which rotates during operation of the gas turbine engine 10, 10.4 so as to provide for rotating—by viscous coupling—the portion 150.1 of the second portion 150 of air 14 that flows therethrough into the combustion chamber 16 through the orifices 172 in the aft wall 142.3 thereof, so as to provide for inducing swirl in the portion 150.1 of the second portion 150 of air 14 that is discharged into the combustion chamber 16. The elements illustrated in FIG. 9 otherwise correspond in both structure and operation to like-numbered elements illustrated in FIG. 8.

Referring to FIGS. 10-15a-c, a fifth embodiment of a gas turbine engine 10, 10.5, incorporates a system for cooling the rotor 24 and associated blades 26 of a turbine 20. The gas turbine engine 10, 10.5 incorporates first 128 and second 130 fuel distribution circuits that, for example, as illustrated in FIGS. 1 and 6-9, are respectively controlled by first 37 and second 132 control valves. The first fuel distribution circuit 128 includes at least one first passage 200 in a first forward shaft portion 88.1 of a shaft assembly 28 of the gas turbine engine 10, 10.5. For example, in accordance with a first embodiment, the first forward shaft portion 88.1' may comprise either a pair of concentric sleeve portions 202.1, 202.2 with a gap 204 therebetween constituting the at least one first passage 200. As another example, in accordance with a second embodiment, the first forward shaft portion 88.1" may comprise a hollow shaft portion 206, the wall 206' of which incorporates one or more axial holes 208, e.g. drilled, therein, constituting the associated at least one first passage 200. The at least one first passage 200 of the first fuel distribution circuit 128 is in fluid communication with the interior 210 of a hollow first aft shaft portion 88.2 of the shaft assembly 28 through a fuel distributor 212, which also provides for fluid communication in the second fuel distribution circuit 130 between the interior 214 of the first forward shaft portion 88.1 and the combustion chamber 16 of the gas turbine engine 10, 10.5. Liquid fuel 12.1 of the first fuel distribution circuit 128 is fed into the at least one first passage 200 at a forward end 216 of the first forward shaft portion 88.1, and liquid fuel 12.2 of the second fuel distribution circuit 130 is fed into the interior 214 of the first forward shaft portion 88.1 also at the forward end 216 thereof.

Figure 10:
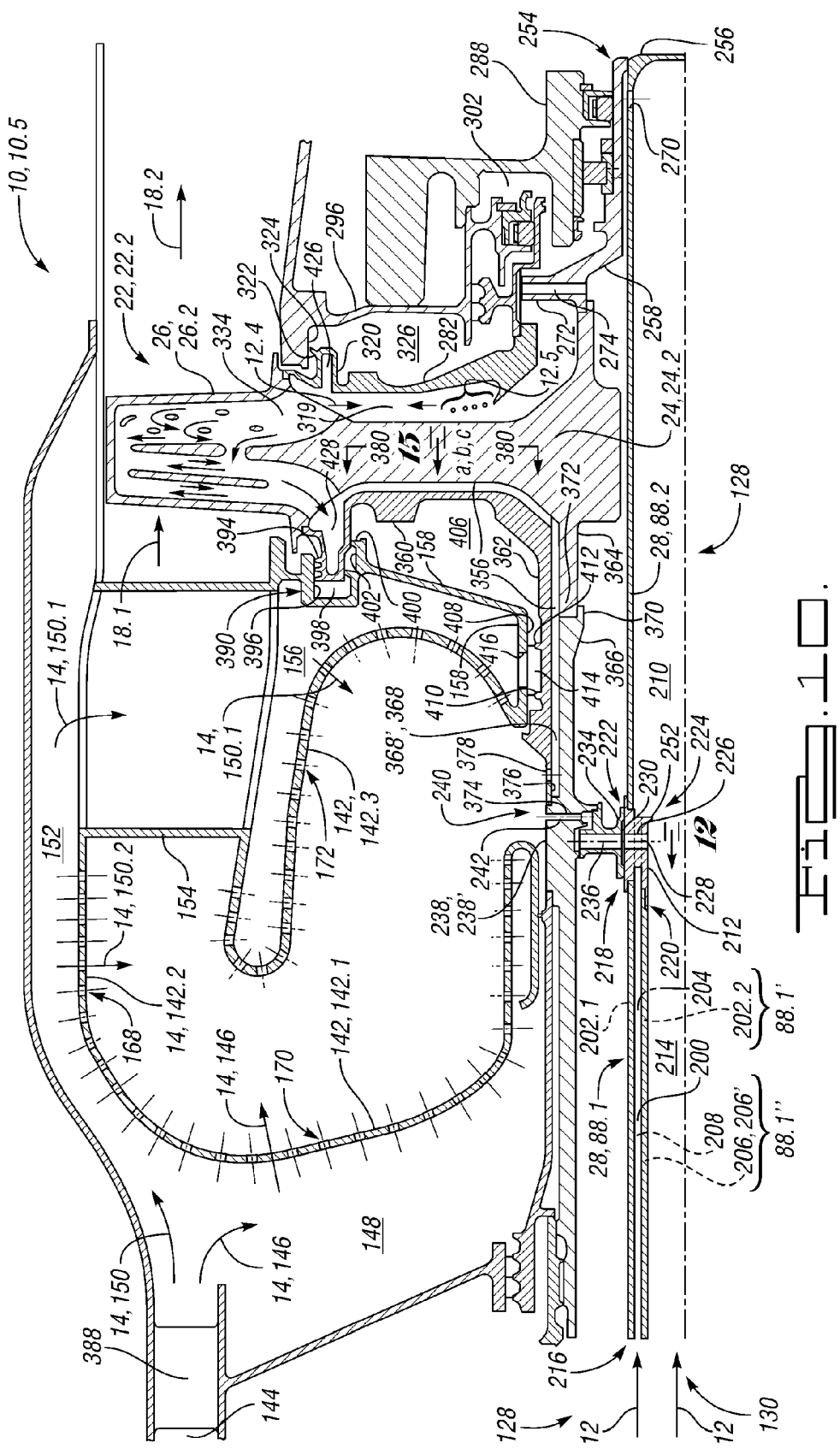
FIG. 10 illustrates an axisymmetric longitudinal cross-sectional view of a fifth embodiment of a gas turbine engine incorporating a system for cooling the turbine rotor and the associated blades thereof.

Referring to FIGS. 10-12, the fuel distributor 212 comprises a hollow cylindrical shaft portion with a forward end 218 adapted to receive an aft end 220 of the first forward shaft portion 88.1, and with an aft end 222 adapted to receive a forward end 224 of the first aft shaft portion 88.2, wherein the inside diameters of the first forward shaft portion 88.1 and the fuel distributor 212 are adapted so that the interior surfaces thereof are substantially flush with one another at the junction therebetween. For example, in the embodiment illustrated in FIGS. 10-12, the forward 218 and aft 222 ends of the fuel distributor 212 are bored to receive the outside portions of the first forward 88.1 and aft 88.2 shaft portions, and the inside of the aft end 220 of the first forward shaft portion 88.1 is bored to receive a mating shouldered portion of the forward end 218 of the fuel distributor 212. The fuel distributor 212 incorporates at least one axial passage 226 therethrough that provides from fluid communication in the first fuel distribution circuit 128 from the at least one first passage 200 in the first forward shaft portion 88.1 therethrough to the interior 210 of the first aft shaft portion 88.2. For example, referring to FIG. 12, a first embodiment of the at least one axial passage 226' comprises a plurality of holes, and a second embodiment of the at least one axial passage 226" comprises a plurality of arcuate slots. The fuel distributor 212 further comprises at least one first radial passage 228 therethrough that provides for fluid communication in the second fuel distribution circuit 130 from the interior 214 of the first forward shaft portion 88.1 to an annular manifold 230 surrounding the fuel distributor 212 and bounded by a groove 232 on the inside of a bushing 234 concentric therewith. The bushing 234 further comprises at least one second radial passage 236 that in cooperation with a surrounding second forward shaft portion 238 provides for a first rotary fluid trap 240 that is in fluid communication with at least one third radial passage 242 in the wall 238' of the second forward shaft portion 238 so as to provide for discharging liquid fuel 12.1 into the combustion chamber 16 from the second fuel distribution circuit 130. More particularly, the at least one second radial passage 236 is in fluid communication with a first annular cavity 244 within the second forward shaft portion 238 surrounding the bushing 234, and the first annular cavity 244 is in fluid communication with a second annular cavity 246 that is separated from the first annular cavity 244 by an internal radial flange 248 having an inside diameter that is less that the outside diameter of the bushing 234 at the at least one third radial passage 242, wherein the second annular cavity 246 is bounded by a lip 250 extended from the bushing 234 and by the inside of the second forward shaft portion 238, wherein the at least one second radial passage 236, the first 244 and second 246 annular cavities, and the internal radial flange 248 constitute the first rotary fluid trap 240. The principles of structure and operation of the first rotary fluid trap 240 are the same as those of the first rotary fluid trap 42 described hereinabove. The fuel distributor 212 further comprises a weir 252 that extends radially inward on the inside thereof, aft of the at least one first radial passage 228 therein, that provides for retaining liquid fuel 12.1 forward of the weir 252 on the inside surfaces of the first forward shaft portion 88.1 and the fuel distributor 212 prior to injection thereof into the combustion chamber 16.

The inside diameter of the first aft shaft portion 88.2 is sufficiently large so that the at least one axial passage 226 in the fuel distributor 212 to which the forward end 224 of the first aft shaft portion 88.2 abuts is in fluid communication with the interior 210 of the first aft shaft portion 88.2 so that liquid fuel 12.1 can discharge from the at least one axial passage 226 in the fuel distributor 212 and then flow along the interior 210 of the first aft shaft portion 88.2 towards an aft end 254 thereof. Although the first forward 88.1 and aft 88.2 shaft portions and the fuel distributor 212 are illustrated as being distinct from one another in the embodiment illustrated in FIGS. 10 and 11—for example, drawn together by a draw bolt (not shown) through the center of the shaft assembly 28,—alternatively, two or more of these components could be combined together. The aft end 254 of the first aft shaft portion 88.2 is terminated with an end cap 256 that acts to retain liquid fuel 12.1 within the first aft shaft portion 88.2.

A second aft shaft portion 258 concentrically surrounds the first aft shaft portion 88.2 from the aft end 254 thereof, whereby an aft end 260 of the second aft shaft portion 258 is sealed to the aft end 254 of the first aft shaft portion 88.2, and the forward end 262 of the second aft shaft portion 258 is adapted to mate with an aft end 264 of a root portion 266 of a rotor 24, 24.2 of an associated bladed rotor 22, 22.2. For example, in the embodiments illustrated in FIGS. 10, 13 and 16, the forward end 262 of the second aft shaft portion 258 mates with a shouldered aft end 264' of the root portion 266 of the rotor 24, 24.2. The inside of the second aft shaft portion 258 is adapted to form a second aft cavity 268 between the inside of the second aft shaft portion 258 and the outside of the first aft shaft portion 88.2, which is in fluid communication with the interior 210 of the first aft shaft portion 88.2 through at least one second passage 270 in the wall thereof proximate to the aft end 254 thereof. The inside diameter of the second aft shaft portion 258 is relatively expanded proximate to the forward end 262 thereof, relative to that of the aft end 260 thereof, and relative to the inside diameter is a proximal portion of the aft end 264 of the root portion 266 of the rotor 24, 24.2. The second aft shaft portion 258 also incorporates a cylindrical flange portion 272 proximate to the forward end 262 thereof, wherein the cylindrical flange portion 272 incorporates a radial at least one third passage 274 that provides for fluid communication from the second aft cavity 268 to a second rotary fluid trap 275, which is bounded between the rim 276 of the cylindrical flange portion 272 and an inner cylindrical groove 278 defined by an aft edge 280 of an aft cover 282, and by a stepped inner boundary 284 of an aft cover extension 286 extending aftward from the aft cover 282 and adapted to rotate therewith.

The second aft shaft portion 258 is supported from a first aft support structure 288 by a rolling element bearing 290 that operates therebetween, and which is sealed by a first sealing element 292, e.g. a carbon seal, located against an first internal radial flange 294 depending from the first aft support structure 288 aft of the rolling element bearing 290. A second aft support structure 296 coupled to the first aft support structure 288 incorporates a second internal radial flange 298 and a second sealing element 300, e.g. a carbon seal, located thereagainst that cooperates with the aft cover extension 286 to provide for sealing a third aft cavity 302 from exhaust gases 18.2 downstream of the bladed rotor 22, 22.2, wherein the third aft cavity 302, which includes the rolling element bearing 290, is bounded by portions of the first 288 and second 296 aft support structures, and by a portions of the aft cover extension 286 and the second aft shaft portion 258. The second aft shaft portion 258 and an inner race 304 of the rolling element bearing 290 incorporate at least one fourth passage 306 that provides for fluid communication of liquid fuel 12.1 from the second aft cavity 268 to the rolling element bearing 290, so as to provide for the lubrication and cooling thereof.

The aft cover 282 comprises an outer rim 60 that engages a lip 62 on an aft side 48 of the rotor 24, 24.2, and comprises a shouldered aft end 308 from which the aft cover extension 286 depends, wherein the joint between the outer rim 60 and the lip 62 is substantially sealed, as is the joint between the shouldered aft end 308 and the aft cover extension 286. A forward surface 310 of the aft cover 282 incorporates a forward sloping surface 312 that extends from an internal cylindrical surface 314 that extends forward from the aft edge 280 of the aft cover 282. The forward sloping surface 312 is terminated by a sharp edge 316 that abuts an undercut surface 318 adjacent thereto, so that the sharp edge 316 defines a circumferential local radial extremum. The forward surface 310 of the aft cover 282 and the aft side 48 of the rotor 24, 24.2 are shaped so as to define a first aft cavity 319 therebetween, wherein the first aft cavity 319 is in fluid communication with an outlet 275.1 of the second rotary fluid trap 275. The aft cover 282 further comprises an aft-extending hollow rim 320 from which the outer rim 60 depends, and from which a first aft labyrinth sealing element 322 depends that cooperates with a first aft internal cylindrical surface 324 of the second aft support structure 296 so as to provide for sealing a fourth aft cavity 326 from exhaust gases 18.2 downstream of the bladed rotor 22, 22.2. A second aft labyrinth sealing element 328 depending from the aft cover extension 286 cooperates with a second aft internal cylindrical surface 330 of the second aft support structure 296 so as to provide for sealing a fifth aft cavity 332 from exhaust gases 18.2 that might leak by the first aft labyrinth sealing element 322 into the fourth aft cavity 326, wherein the second sealing element 300 provides for sealing the third aft cavity 302 from exhaust gases 18.2 that might leak by the second aft labyrinth sealing element 328 into the fifth aft cavity 332.

Figures 13, 14:
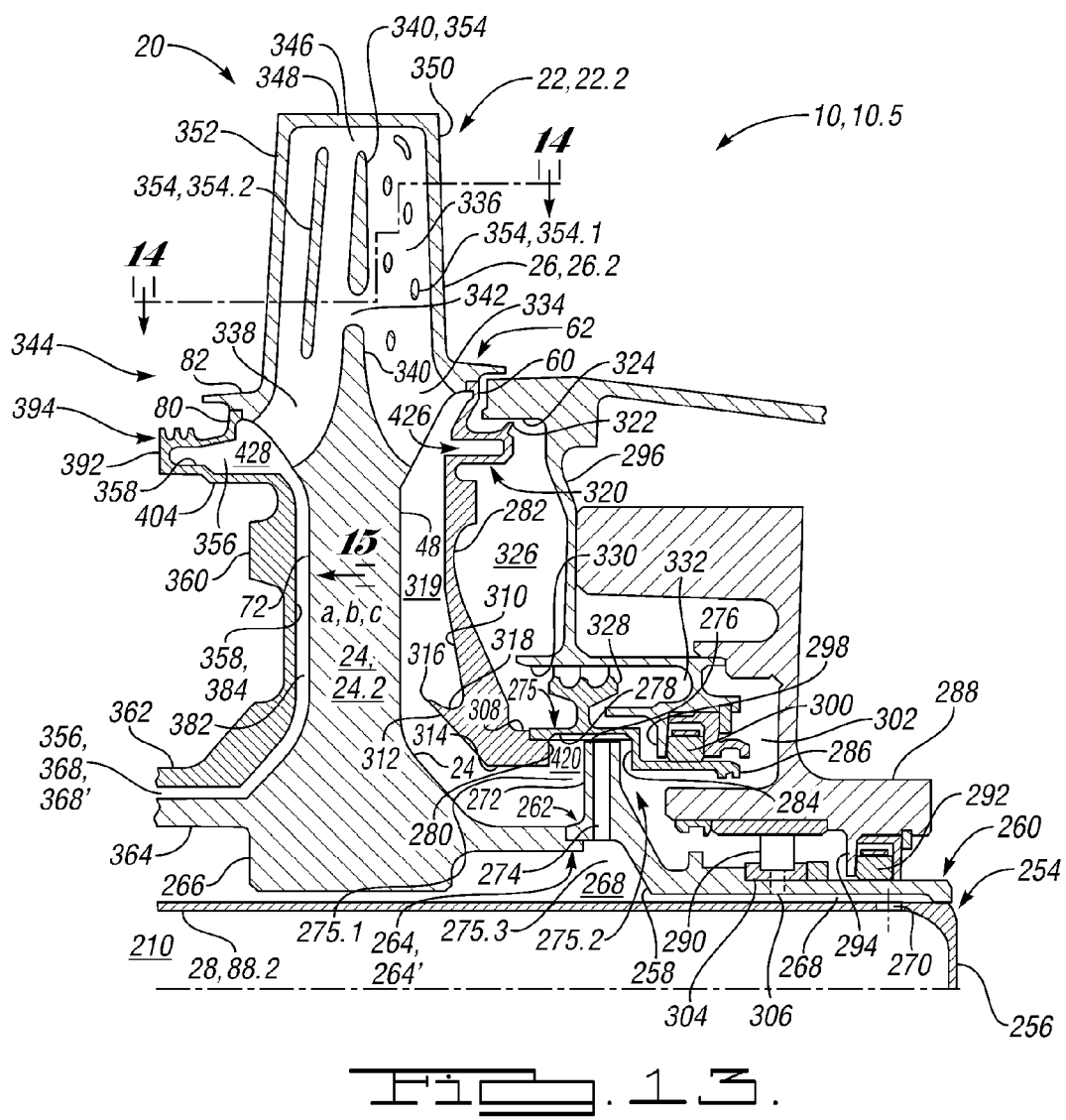
FIG. 13 illustrates an expanded fragmentary longitudinal cross-sectional view of a portion of the fifth embodiment of the gas turbine engine illustrated in FIG. 10 associated with cooling the associated turbine rotor and associated blades thereof, incorporating a second embodiment of a bladed rotor.
FIG. 14 illustrates a circumferential cross-sectional view of a turbine blade of the second embodiment of the bladed rotor incorporated in the gas turbine engine illustrated in FIGS. 10 and 13.

Referring to FIGS. 10, 13 and 14, in accordance with a second embodiment of a bladed rotor 22, 22.2, the first aft cavity 319 is in fluid communication with at least one inlet duct 334 in a blade 26, 26.2 of the bladed rotor 22, 22.2 incorporating a plurality of blades 26, 26.2. The at least one inlet duct 334 is in fluid communication with a hollow interior 336 of the blade 26, 26.2, and with a corresponding at least one outlet duct 338, wherein at least one inlet duct 334 and the at least one outlet duct 338 are separated from one another by a partition 340 with at least one first opening 342 therein proximate to a base 344 of the blade 26, 26.2, and at least one second opening 346 therein proximate to a tip 348 of the blade 26, 26.2. The at least one inlet duct 334 provides for feeding fuel 12 in either an atomized, vaporous or gaseous state from the first aft cavity 319 into a portion of the hollow interior 336 proximate to a trailing edge 350 of the blade 26, 26.2, and the at least one outlet duct 338 provides for discharging relatively heated fuel 12, 12.4 from a portion of the hollow interior 336 proximate to a leading edge 352 of the blade 26, 26.2.

The blade 26, 26.2 incorporates a plurality of transverse ribs 354 within the hollow interior 336. A plurality of first transverse ribs 354.1 aft of the partition 340 are relatively shorter in radial dimension than a second transverse rib 354.2 located forward of the partition 340, which provide for a combination of thermosiphon and serpentine flow within and amongst the spaces between the transverse ribs 354. It should be understood that in alternative embodiments, the transverse ribs 354 of the blade 26, 26.2 could consist entirely of one or more first transverse ribs 354.1 or entirely one or more second transverse rib(s) 354.2, or that the partition 340 could comprise one or more first transverse ribs 354.1 distal to the at least one first opening 342.

The at least one outlet duct 338 is in fluid communication with a first forward cavity 356 bounded by a forward side 72 of the rotor 24, 24.2 and by an aft surface 358 of a forward cover 360, the latter of which comprises an outer rim 80 that engages a lip 82 on the forward side 72 of the rotor 24, 24.2. The forward cover 360 incorporates a nose portion 362 concentrically surrounding a cylindrical forward extension 364 of the root portion 266 of the rotor 24, 24.2, and concentrically surrounding an aft portion 366 of the second forward shaft portion 238 that is undercut so as to provide a gap 368 therebetween, wherein an annular cavity 368' associated with the gap 368 is in fluid communication with, and an extension of, the first forward cavity 356. A shouldered aft end 370 of the second forward shaft portion 238 abuts a forward end 372 of the cylindrical forward extension 364 of the root portion 266 of the rotor 24, 24.2. The forward end 374 of the nose portion 362 of the forward cover 360 overlaps the second forward shaft portion 238 adjacent to the forward end 376 of the gap 368, and a portion of the nose portion 362 proximal thereto incorporates at least one fifth passage 378 therethrough so as to provide for fluid communication from the first forward cavity 356 to the combustion chamber 16.

Referring to FIGS. 10, 13 and 15a-15c, a medial portion 380 of the forward cover 360 incorporates a set of vanes 382 on an aft surface 384 thereof that substantially conform to the surface of the forward side 72 of the rotor 24, 24.2, and that provide for a substantially forced rotation of fuel 12, 12.4 flowing radially inwards within the first forward cavity 356 guided by the set of vanes 382, which provides for reducing the pressure within the hollow interior 336 of the blade 26, 26.2 relative to that would occur without the set of vanes 382 incorporated onto the aft surface 384 of the forward cover 360. FIGS. 15a-15c respectively illustrate a direction of sweep that is in a direction of rotation 386, radial, and opposite to a direction of rotation 386, respectively.

The at least one fifth passage 378 provides for discharging fuel 12 from the first fuel distribution circuit 128 into the combustion chamber 16 aft of the at least one third radial passage 242 that provides for discharging liquid fuel 12.1 from the second fuel distribution circuit 130. The combustion chamber 16 is adapted to receive air 14 both upstream and downstream, both of the at least one fifth passage 378 and of the at least one third radial passage 242, which provides for cooling the walls 142 of the combustion chamber 16, and which mixes with and provides for the combustion of the liquid fuel 12.1 sprayed from the at least one third radial passage 242 and of the fuel 12, 12.4 in a vaporous or gaseous state discharged from the at least one fifth passage 378. More particularly, air 14 (also known as CDP air, i.e. Compressor Discharge Pressure air) is supplied to a first annular plenum 144 by a compressor (not illustrated) of the gas turbine engine 10, 10.5. Air 14 from the first annular plenum 144 flows through a set of straightening vanes 388, and is then bifurcated into a first portion 146 flowing into a second annular plenum 148 located adjacent to a forward wall 142.1 of the combustion chamber 16, and a remaining second portion 150 flowing into a third annular plenum 152 radially adjacent to an outer circumferential wall 142.2 of the combustion chamber 16. At least a portion 150.1 of the second portion 150 of air 14 in the third annular plenum 152 flows through the interior of a hollow vane 154 extending across a downstream portion of the combustion chamber 16, and into a fourth annular plenum 156 adjacent to an aft wall 142.3 of the combustion chamber 16. The fourth annular plenum 156 is bounded by the aft wall 142.3 of the combustion chamber 16 and by an inner shroud 158, wherein the inner shroud 158 is adapted with an annular pocket 390 that cooperates with a forward-extending hollow rim 392 incorporated in the forward cover 360, from which the associated outer rim 80 depends, and from which a first forward labyrinth sealing element 394 depends that cooperates with a first forward internal cylindrical surface 396 of the annular pocket 390 so as to provide for sealing a second forward cavity 398 from exhaust gases 18.1 upstream of the bladed rotor 22, 22.2. A second forward labyrinth sealing element 400 depending from a first forward external cylindrical surface 402 of the annular pocket 390 cooperates with a second forward internal cylindrical surface 404 on the forward-extending hollow rim 392 so as to provide for sealing a third forward cavity 406 from exhaust gases 18.1 that leak by the first forward labyrinth sealing element 394 into the second forward cavity 398. A second forward internal cylindrical surface 408 of the inner shroud 158 cooperates with third 410 and fourth 412 forward labyrinth sealing elements that depend from the nose portion 362 of the forward cover 360, and between which is defined a fourth forward cavity 414 that is pressured with air 14 from the fourth annular plenum 156 in fluid communication therewith through at least one sixth passage 416 in the second forward internal cylindrical surface 408 of the inner shroud 158.

The exterior of the hollow vane 154, located upstream of the turbine 20, provides for guiding or straightening exhaust gases 18.1 flowing thereby into the turbine 20. The outer circumferential wall 142.2 of the combustion chamber 16 is adapted with one or more orifices 168, for example, effusion cooling holes, that provide for a remaining portion 150.2 of the second portion 150 of air 14 in the third annular plenum 152 to flow generally radially inward directly into the combustion chamber 16. The forward wall 142.1 of the combustion chamber 16 is adapted with one or more orifices 170, for example, effusion cooling holes, that provide for the first portion 146 of air 14 to flow from the second annular plenum 148 into the combustion chamber 16. The aft wall 142.3 of the combustion chamber 16 is adapted with one or more orifices 172, for example, effusion cooling holes, that provide for the portion 150.1 of the second portion 150 of air 14 to flow from the fourth annular plenum 156 into the combustion chamber 16. As used herein, the term annular is intended to mean that which comprises at least a portion of an associated annulus or an approximation thereof, for example, at least one circumferential segment of an annulus, or that which has a cross-section that corresponds to that of a corresponding annulus.

In accordance with a first mode of operation of the gas turbine engine 10, 10.5, liquid fuel 12.1 of the first fuel distribution circuit 128 enters the forward end 216 of the first forward shaft portion 88.1 of the shaft assembly 28, flows aftward through the at least one at least one first passage 200 therein, flows aftward through the at least one axial passage 226 in the fuel distributor 212, and then flows aftward along the interior 210 of the hollow first aft shaft portion 88.2 that abuts therewith. The liquid fuel 12.1 is then discharged from the interior 210 of the hollow first aft shaft portion 88.2 into the second aft cavity 268 through the at least one second passage 270. A portion of the liquid fuel 12.1 in the second aft cavity 268 flows through the at least one fourth passage 306 so as to provide for cooling and lubricating the rolling element bearing 290, and then is discharged from the second aft cavity 268 into a first inlet 275.2 of the second rotary fluid trap 275, wherein while under rotation, liquid fuel 12.1 collects in a trap portion 420 of the second rotary fluid trap 275, and discharges from an outlet 275.1 thereof into the first aft cavity 319 responsive to the relative pressures and fluid levels at the first inlet 275.2 and the outlet 275.1 of the second rotary fluid trap 275, wherein the level of the trap portion 420 of the second rotary fluid trap 275 is defined by the internal cylindrical surface 314 of the aft cover 282. The bulk of the liquid fuel 12.1 in the second aft cavity 268 is discharged therefrom into a second inlet 275.3 of the second rotary fluid trap 275 into the at least one third passage 274, and through the second rotary fluid trap 275 into the first aft cavity 319 responsive to the relative pressures and fluid levels at the second inlet 275.3 and the outlet 275.1 of the second rotary fluid trap 275. The principle of operation of the second rotary fluid trap 275 is the same as that of the first rotary fluid trap 42 described hereinabove.

Upon discharge from the outlet 275.1 of the second rotary fluid trap 275, the liquid fuel 12.1 flows along the internal cylindrical surface 314 to the forward sloping surface 312 of the aft cover 282, after which the liquid fuel 12.1 is slung from the associated sharp edge 316, and atomized within the first aft cavity 319. The resulting atomized fuel 12.5 is slung radially outwards responsive to associated centrifugal forces, and mixes with fuel 12, 12.4 in a gaseous or vapor state that had been heated within the hollow interior 336 of the blade 26, 26.2, and which being relatively less dense, flows from the at least one inlet duct 334 of the blade 26, 26.2, back into the first aft cavity 319. The fuel 12, 12.4 in a gaseous or vapor state flows into the first aft cavity 319 as a result of a buoyancy-driven recirculation from the heated region of the hollow interior 336 of the blade 26, 26.2, and, as a result of the rotation of the turbine 20, flows in a swirling pattern associated with free vortex flow within the first aft cavity 319, thereby mixing with the atomized fuel 12.5 slung radially outwards from the sharp edge 316 depending from the aft cover 282, so as to cause the vaporization of the atomized fuel 12.5 within the first aft cavity 319, which cools the associated gaseous or vapor fuel 12, 12.4, thereby increasing the density thereof resulting in an associated buoyancy-driven radially outwards flow thereof.

Fuel 12, 12.4, 12.5 from the first aft cavity 319 flows into the at least one inlet duct 334 of the blade 26, 26.2, and is heated by wall surfaces of the hollow interior 336 of the blade 26, 26.2, and by the transverse ribs 354 therein, subject to either thermosiphon or serpentine flow, or both, within the hollow interior 336, thereby heating the fuel 12, 12.4 to a gaseous or vapor state, e.g. as indicted by the locus of points labeled "X" on FIG. 4, for which either the pressure at a given temperature is less than that of the "saturated liquid" boundary, or for which the temperature is greater than the critical temperature. A relatively less dense portion of the fuel 12, 12.4 flows across the at least one first opening 342 in the partition 340 proximate to the base 344 of the blade 26, 26.2, and a relatively more dense portion of the fuel 12, 12.4 flows across the at least one second opening 346 in the partition 340 proximate to the tip 348 of the blade 26, 26.2. Relatively less dense, heated fuel 12, 12.4 is discharged radially inwards from the at least one outlet duct 338 of the blade 26, 26.2, into the first forward cavity 356, whereupon it continues to flow radially inwards through the vanes 382 on the medial portion 380 of the forward cover 360 that rotate therewith, so as to impose a forced rotation on the radially inwardly flowing fuel 12, 12.4, wherein the associated forced flow field provides for a greater pressure drop that would otherwise occur with a corresponding unconstrained flow field, which provides for reducing the pressure in the blade 26, 26.2 relative to that without a forced flow field, wherein the pressure in the blade 26, 26.2 is responsive to the pressure in the combustion chamber 16 and to the pressure drop across the medial portion 380 of the first forward cavity 356. The fuel 12, 12.4 then flows forward along the annular cavity 368' until it is discharged therefrom through the at least one fifth passage 378 into the combustion chamber 16, whereupon the fuel 12, 12.4 mixes with the air 14, 146, 150.2, 150.1, that is discharged respectively though orifices 170, 168, 172 in the forward 142.1, outer circumferential 142.2 and aft 142.3 walls of the combustion chamber 16, respectively.

The first aft labyrinth sealing element 322 depending from the aft-extending hollow rim 320, in cooperation with the associated first aft internal cylindrical surface 324 of the second aft support structure 296, provides for mitigating against infiltration of exhaust gases 18.2 into the fourth aft cavity 326. The interior 426 of the aft-extending hollow rim 320 is in fluid communication with the first aft cavity 319, which accordingly provides for keeping the aft-extending hollow rim 320 in thermal equilibrium with the remainder of the aft cover 282, so as mitigate against thermally-induced distortion of the aft-extending hollow rim 320, thereby providing for first aft labyrinth sealing element 322 to cooperate with the first aft internal cylindrical surface 324 in mitigating against infiltration of exhaust gases 18.2 into the fourth aft cavity 326 over a wide range of operating conditions of the gas turbine engine 10, 10.5.

Similarly, the first forward labyrinth sealing element 394 depending from the forward-extending hollow rim 392, in cooperation with the associated first forward internal cylindrical surface 396 of the annular pocket 390, and the second forward labyrinth sealing element 400 depending from the first forward external cylindrical surface 402 of the annular pocket 390, in cooperation with the associated second forward internal cylindrical surface 404 of forward-extending hollow rim 392, provide for mitigating against the infiltration of exhaust gases 18.1 into the second 398 and third 406 forward cavities. The interior 428 of the forward-extending hollow rim 392 is in fluid communication with the first forward cavity 356, which accordingly provides for keeping the forward-extending hollow rim 392 in thermal equilibrium with the remainder of the forward cover 360, so as mitigate against thermally-induced distortion of the forward-extending hollow rim 392, thereby providing for first 394 and second 400 forward labyrinth sealing elements to respectively cooperate with the first forward internal cylindrical surface 396 and the first forward external cylindrical surface 402, respectively, in mitigating against infiltration of exhaust gases 18.1 into the second 398 and third 406 forward cavities, respectively, over a wide range of operating conditions of the gas turbine engine 10, 10.5. Furthermore, the pressurization of the fourth forward cavity 414 with air 14, 150.1 from the fourth annular plenum 156 provides for preventing the exhaust gases 18.1 that might otherwise enter the second 398 or third 406 forward cavities from infiltrating the fourth forward cavity 414, or further provides for preventing the exhaust gases 18.1 from even entering the second forward cavity 398.

While operating, the second forward shaft portion 238 becomes heated by the combustion of fuel 12 within the combustion chamber 16, which heat is transferred to the first forward shaft portion 88.1 by conduction through the fuel distributor 212, and by radiation and convection, although the separation of the first 88.1 and second 238 forward shaft portions provides for reducing the heating of the first forward shaft portion 88.1 that would otherwise occur absent the presence of the concentric second forward shaft portion 238. Furthermore, the first forward shaft portion 88.1 is cooled by the aftwards flow of liquid fuel 12.1 along the inner surface thereof, which also provides for cooling the second forward shaft portion 238, and which provides for preheating the liquid fuel 12.1.

In accordance with a second mode of operation of the gas turbine engine 10, 10.5, liquid fuel 12.1 of the second fuel distribution circuit 130 enters the forward end 216 of the first forward shaft portion 88.1 of the shaft assembly 28, flows aftward along the interior 214 of the first forward shaft portion 88.1, and then flows radially outwards through the at least one second radial passage 236 in the fuel distributor 212, wherein the weir 252 at the aft end 222 of the fuel distributor 212 prevents further aftward axial flow of the liquid fuel 12.1 therepast. The liquid fuel 12.1 from the at least one second radial passage 236 flows into the annular manifold 230 between the fuel distributor 212 and the surrounding bushing 234, and then through the at least one second radial passage 236 into the first rotary fluid trap 240, which isolates the relatively low pressure in the second fuel distribution circuit 130 upstream thereof from the relatively high pressure of the combustion chamber 16. Liquid fuel 12.1 is retained within a trap portion 430 at a level defined by the internal radial flange 248 between the first 244 and second 246 annular cavities associated with the first rotary fluid trap 240, whereby the level of liquid fuel 12.1 in the at least one second radial passage 236 will be responsive the rate of rotation of the first rotary fluid trap 240 and to the pressure drop thereacross. Liquid fuel 12.1 from the first rotary fluid trap 240 is then discharged into the combustion chamber 16 through the at least one third radial passage 242 in the wall 238' of the second forward shaft portion 238.

The second fuel distribution circuit 130 is generally used for starting the gas turbine engine 10, 10.5, and for augmenting the power thereof under conditions when there is insufficient heat to otherwise vaporize a sufficient amount of fuel 12 in the first fuel distribution circuit 128. In addition to providing for cooling the blades 26 and rotor 24, 24.2 of the turbine 20, the first fuel distribution circuit 128 also provides for a regenerative recovery of heat from the exhaust gases 18.1 so as to provide for improved operating efficiency.

Figure 16:
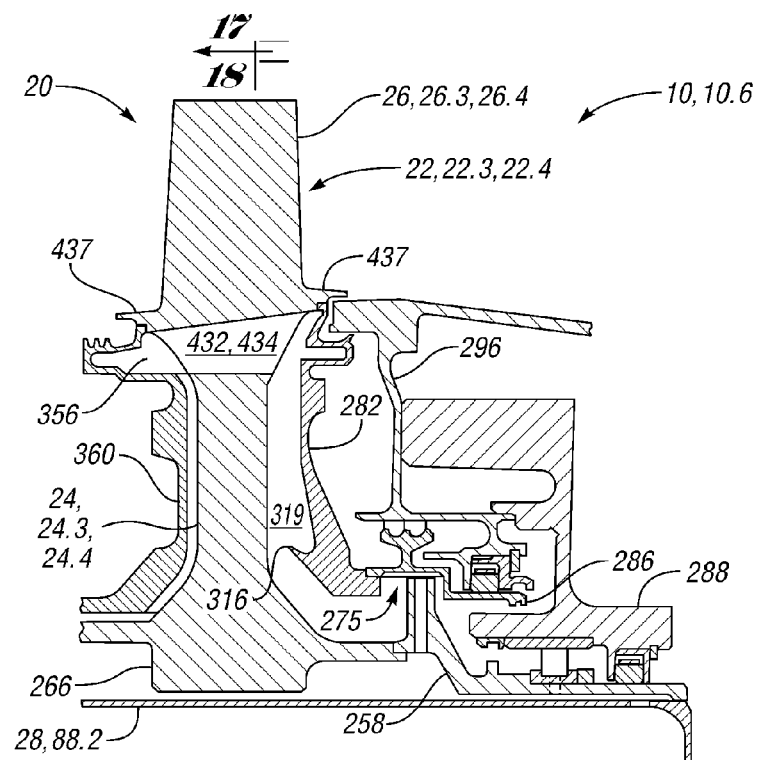
FIG. 16 illustrates an expanded fragmentary longitudinal cross-sectional view of a portion of a gas turbine engine associated with cooling the associated turbine rotor and associated blades thereof, incorporating either a third or fourth embodiment of a bladed rotor.
Figures 17, 18:
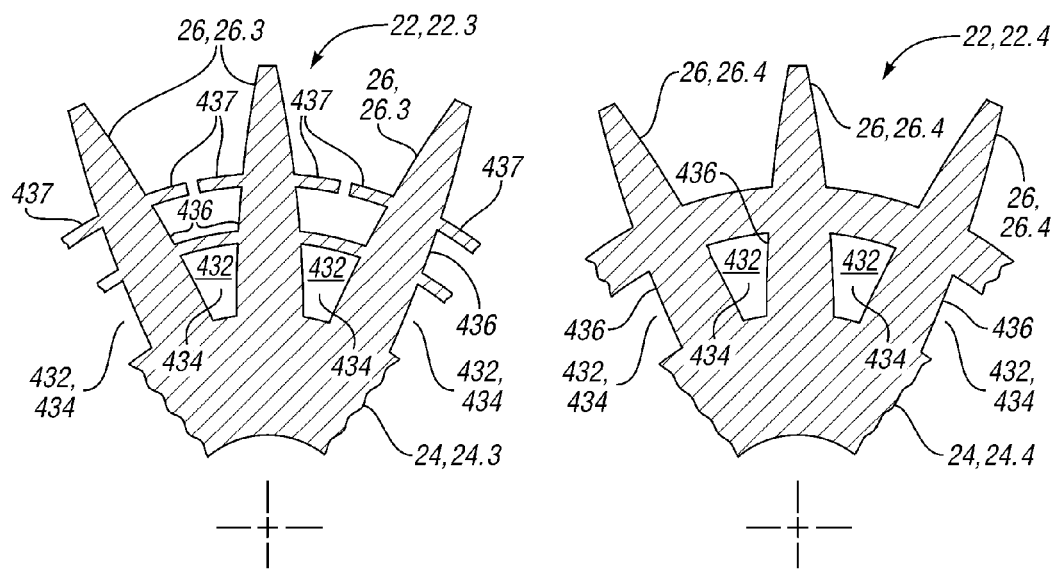
FIG. 17 illustrates a fragmentary radial cross-sectional view of a third embodiment of a bladed rotor incorporated in a first aspect of the portion of the gas turbine engine illustrated in FIG. 16.
FIG. 18 illustrates a fragmentary radial cross-sectional view of a fourth embodiment of a bladed rotor incorporated in a second aspect of the portion of the gas turbine engine illustrated in FIG. 16.

Referring to FIGS. 16-18, a sixth embodiment of a gas turbine engine 10, 10.6, and various aspects thereof, incorporate a system for cooling a rotor 24 and associated blades 26 of a turbine 20. More particularly, the sixth embodiment of the gas turbine engine 10, 10.6 is the same in structure and function as the fifth embodiment of the gas turbine engine 10, 10.5 illustrated in FIGS. 10-15, except for the configuration of the bladed rotor 22, 22.3, 22.4, for which two alternative embodiments thereof are illustrated in FIGS. 17 and 18 respectively. In both of these embodiments, the bladed rotor 22, 22.3, 22.4 comprises substantially solid blades 26, 26.3, 26.4 and an associated cooling circuit 432 through the associated rotor 24, 24.3, 24.4. For example, referring to FIGS. 16 and 17, in accordance with a third embodiment of a bladed rotor 22, 22.3, the associated cooling circuit 432 comprises a plurality of passages 434 below and between the root portions 436 of adjacent blades 26, 26.3. Associated blade platforms 437, depending from the blades 26, 26.3, are located at a boundary of the flow path associated with the turbine 20, wherein blade platforms 437 associated with different blades 26, 26.3 are separated from one another. The blade platforms 437 act as a heat shield for the associated root portions 436 of the blades 26, 26.3. As another example, referring to FIGS. 16 and 18, in accordance with a fourth embodiment of a bladed rotor 22, 22.4, the associated cooling circuit 432 comprises a plurality of passages 434 between the root portions 436 of adjacent isothermal blades 26, 26.4. The passages 434 of the cooling circuit 432 through the rotor 24, 24.3, 24.4 are aligned with the first aft 319 and first forward 356 cavities, so as to provide for fuel 12 to flow from the first aft cavity 319 through the passage 434 and into the first forward cavity 356 so as to provide for cooling the rotor 24, 24.3, 24.4 and the blades 26, 26.3, 26.4 of the associated bladed rotor 22, 22.3, 22.4, and as a result, preheating the fuel 12, 12.4 to a vapor or gaseous state. The elements illustrated in FIGS. 16-18 otherwise correspond in both structure and operation to like-numbered elements illustrated in FIGS. 10-15.

Referring to FIGS. 19-23, a fifth embodiment of a bladed rotor 22, 22.5—comprising a rotor 24, 24.5 incorporating a plurality of blades 26, 26.5 distributed circumferentially thereabout—is similar to the second embodiment of the bladed rotor 22, 22.2 illustrated in FIGS. 10 and 13. For each blade 26, 26.5 of the plurality of blades 26, 26.5, the first aft cavity 319 of the bladed rotor 22, 22.5 is in fluid communication with an inlet duct 334 extending into an aft portion the blade 26, 26.5 of the bladed rotor 22, 22.5, which is, in turn, in fluid communication with the hollow interior 336 of the blade 26, 26.5, and with a corresponding an outlet duct 338 extending from a forward portion of the blade 26, 26.5. The inlet 334 and outlet 338 ducts are separated from one another by a central rib 440 that extends generally circumferentially across the interior of the blade 26, 26.5, and that is continuous with, and extends radially outward, from the rotor portion 24, 24.5 of the bladed rotor 22, 22.5, wherein the central rib 440 incorporates an opening 442,—for example, an elliptically shaped opening 442' with the major axis generally oriented in a radial direction therethrough—located outboard of, but proximate to, a hoop portion 444 of the blade 26, 26.5 that provides for a fluid communication between the inlet 334 and outlet 338 ducts. An outboard end 440.1 of the central rib 440 is separated from the tip 348 of the blade 26, 26.5 by an associated gap 446 therebetween that provides for fluid communication between an aft hollow interior portion 336.1 of the of the blade 26, 26.5, and a forward hollow interior portion 336.2, wherein the aft 336.1 and forward 336.2 hollow interior portions of the blade 26, 26.5 are separated from one another by the central rib 440. For example, in one embodiment, the outboard end 440.1 of the central rib 440 is at about 90 percent of the height of the blade 26, 26.5.

The aft hollow interior portion 336.1 of the blade 26, 26.5 incorporates a radially-extending aft transverse rib 448 therein, extending generally circumferentially thereacross, and extending radially outboard from within the hoop portion 444 of the blade 26, 26.5, wherein an inboard end 448.1 of the aft transverse rib 448 is located within a portion of the associated inlet duct 334, and an outboard end 448.2 of the aft transverse rib 448 is separated from the tip 348 of the blade 26, 26.5 by an associated gap 450 therebetween. Similarly, the forward hollow interior portion 336.2 of the blade 26, 26.5 incorporates a radially-extending forward transverse rib 452 therein, extending generally circumferentially thereacross, and extending radially outboard from within the hoop portion 444 of the blade 26, 26.5, wherein an inboard end 452.1 of the forward transverse rib 452 is located within a portion of the associated outlet duct 338, and an outboard end 452.2 of the forward transverse rib 452 is separated from the tip 348 of the blade 26, 26.5 by an associated gap 454 therebetween. Accordingly, the aft 448 and forward 452 transverse ribs provide for a combination of thermosiphon and serpentine flow within the aft 336.1 and forward 336.2 hollow interior portions of the blade 26, 26.5.

The aft hollow interior portion 336.1 of the blade 26, 26.5 also incorporates a plurality of transverse pedestals 456 located aft of the associated aft transverse rib 448, and forward of the trailing edge 350 of the blade 26, 26.5, wherein each transverse pedestal 456 extends generally circumferentially across the aft hollow interior portion 336.1 of the blade 26, 26.5. For example, in the embodiment illustrated in FIGS. 19-22, the plurality of transverse pedestals 456 are organized as two columns 458.1, 458.2, each substantially parallel to the associated aft transverse rib 448, each containing four transverse pedestals 456 that are radially-separated from one another and from the tip 348 of the blade 26, 26.5, so as to provide for a flow of fuel 12 therebetween, so as to provide for heat transfer from the blade 26, 26.5 to the fuel 12 at the sides of the transverse pedestals 456.

The forward hollow interior portion 336.2 proximate to the leading edge 352 of the blade 26, 26.5 incorporates a plurality of blade-centric internally-peripheral ribs 462 so as to improve the structural integrity of the blade 26, 26.5, particularly on the suction side thereof, and so as to provide for enhancing the cooling of the leading edge 352 of the blade 26, 26.5. Alternatively, the internally-peripheral ribs 462 could be extended around the entire interior of the blade 26, 26.5 so as to provide for enhanced hoop strength of the blade 26, 26.5. The internally-peripheral ribs 462 in cooperation with the central rib 440, the aft 448 and forward 452 transverse ribs, and the plurality of transverse pedestals 456, provide for holding the blade 26, 26.5 together responsive to substantial pressures during operation thereof. For example, in one embodiment, the blade 26, 26.5 is adapted to withstand a pressure of 7,000 pounds per square inch from the associated fuel 12 in a supercritical state.

The inlet duct 334 provides for feeding fuel 12 in either an atomized, vaporous or gaseous state from the first aft cavity 319 into the aft hollow interior portion 336.1 proximate to the trailing edge 350 of the blade 26, 26.5, and the outlet duct 338 provides for discharging relatively heated fuel 12, 12.4 from the forward hollow interior portion 336.2 proximate to the leading edge 352 of the blade 26, 26.5. The a fifth embodiment of a bladed rotor 22, 22.5 does not incorporate the above-described first set 66.1 of first passages 66 that extend through the rotor 24 at associated circumferential locations that are substantially between the associated circumferential locations of the associated blades 26, 26.1 the provided for cooling the rim 120 of the rotor 24 in the regions between the blades 26, but without communicating with the interior of the blades 26. Accordingly, in the fifth embodiment of a bladed rotor 22, 22.5, all fuel 12 is forced to flow through the aft 336.1 and forward 336.2 hollow interior portions of each blade 26, 26.5, so as to provide for enhanced heat transfer therein and therefore, so as to provide for relatively more effectively cooling the blades 26, 26.5.

The inlet ducts 334 are each contoured so as to direct the fuel 12 radially outward into the aft hollow interior portion 336.1 of the of the blade 26, 26.5, after which the fuel 12 then flows to the forward hollow interior portion 336.2 either through the opening 442 through the central rib 440 or through the gap 446 between the outboard end 440.1 of the central rib 440 and the tip 348 of the blade 26, 26.5, after which the fuel 12 then flows radially inward into the outlet ducts 338 that are also contoured so as to redirect the radially-inward flow obliquely forward and radially-inward towards the hollow interior of the first forward labyrinth sealing element 394, so as to provide for the cooling thereof. The opening 442 though the central rib 440 provides for equalizing the radial pressure gradient of the of the fuel 12 coolant between the aft 336.1 and forward 336.2 hollow interior portions of each blade 26, 26.5, which therefore provides for equalizing the density of the fuel 12 across the opening 442.

The outlet duct 338 is in fluid communication with a first forward cavity 356 bounded by a forward side 72 of the rotor 24, 24.5 and by an aft surface 358 of a forward cover 360, the latter of which comprises an outer rim 80 that is welded to a lip 82 on the forward side 72 of the rotor 24, 24.5. The aft cover 282 comprises an outer rim 60 that is welded to a lip 62 on an aft side 48 of the rotor 24, 24.5.

As with the second embodiment of the bladed rotor 22, 22.2, the aft cover 282 comprises an aft-extending hollow rim 320 from which a first aft labyrinth sealing element 322 depends, a second aft labyrinth sealing element 328 depends from an associated aft cover extension 286, and a forward-extending hollow rim 392 is incorporated in the forward cover 360, from which a first forward labyrinth sealing element 394 and a second forward internal cylindrical surface 404 depends, all of which operate as described hereinabove for the second embodiment of the bladed rotor 22, 22.2. For example, the aft-extending 320 and forward-extending 392 hollow rims and associated first aft 322 and forward 394 labyrinth sealing elements are integrally machined with the respective aft 282 and forward 360 covers, respectively. These provide for corresponding associated flexible joints that provide for reducing stresses in the associated aft 282 and forward 360 covers responsive to associated radial thermal gradients. More particularly, the aft-extending 320 and forward-extending 392 hollow rims provide for relieving the thermal gradient between the relatively hot outer rims 60, 80 of the rotor 24, 24.5 and the corresponding relatively cool respective associated aft 282 and forward 360 covers. Furthermore, the aft-extending 320 and forward-extending 392 hollow rims and the associated first aft 322 and forward 394 labyrinth sealing elements are adapted to flex.

The fifth embodiment of the bladed rotor 22, 22.5 further incorporates a plurality of dowels 464, each of which is axially oriented so as to act between the cylindrical flange portion 272 of the second aft shaft portion 258 and the aft cover 282, so as to restrain against axial deflection of the aft cover 282, without more than insubstantially affecting the associated flow of fuel 12 from the outlet 275.1 of the second rotary fluid trap 275. For example, in one embodiment, the plurality of dowels 464 is eight in number, all of which are concentric with respect to the second aft shaft portion 258 and uniformly distributed therearound.

As with the second embodiment of the bladed rotor 22, 22.2, the forward surface 310 of the aft cover 282 incorporates a forward sloping surface 312 that extends from an internal cylindrical surface 314 that extends forward from the aft edge 280 of the aft cover 282. The forward sloping surface 312 is terminated by a sharp edge 316 that abuts an undercut surface 318 adjacent thereto, so that the sharp edge 316 defines a circumferential local radial extremum, so as to constitute a lip 316' of a fuel slinger that provides for improving the vaporization of the fuel 12 via free vortex expansion, and that provides for reducing thermal gradients in the rotor 24, 24.5 and in the aft cover 282, by allowing the resulting atomized fuel 12.5 to vaporize within the first aft cavity 319 without wetting either the aft surface of the rotor 24, 24.5 or the forward surface of the aft cover 282.

Figure 23:
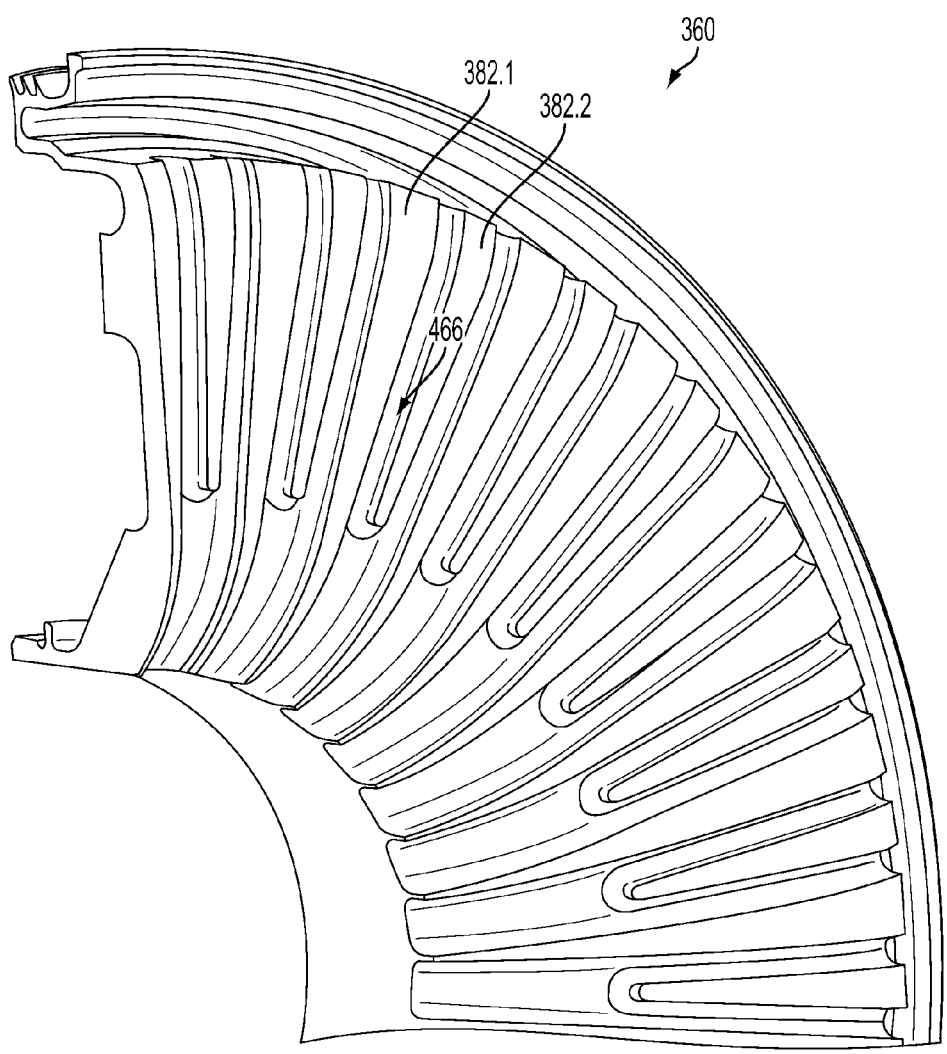
FIG. 23 illustrates a vane portion of a front cover of the fifth embodiment of a bladed rotor illustrated in FIG. 19.

Referring also to FIG. 23, the medial portion 380 of the forward cover 360 incorporates a set of vanes 382.1, 382.2 of alternating lengths that form a plurality of radial channels 466 on the aft surface 384 thereof that substantially conform to the surface of the forward side 72 of the rotor 24, 24.5, and that provide for a substantially forced rotation of fuel 12, 12.4 flowing radially inwards within the first forward cavity 356 guided by the set of vanes 382, which provides for reducing the pressure within the hollow interior 336 of the blade 26, 26.5 relative to that would occur without the set of vanes 382 incorporated onto the aft surface 384 of the forward cover 360.

Otherwise, the fifth embodiment of the bladed rotor 22, 22.5 illustrated in FIGS. 19-23 generally operates in accordance with the above-described a fifth embodiment of the gas turbine engine 10, 10.5. The fifth embodiment of the bladed rotor 22, 22.5 provides for relatively reducing the radial thermal gradient in the bladed rotor 22, 22.5 relative to the first embodiment of the bladed rotor 22, 22.1, which accordingly provides for reducing associated thermally-induced mechanical stresses.

The fifth embodiment of the bladed rotor 22, 22.5 may be manufactured, for example, by either casting or additive manufacturing. For example, if cast, the opening 442 though the central rib 440 provides for improved cast core stability and durability.

Referring to FIG. 8, but applicable to all embodiments, it is generally desirable that the blades 26 of the bladed rotor 22 be sufficiently hot when flowing fuel 12 therethrough so as to guarantee that little or substantially none of the fuel 12 within the blades 26 is in a liquid state, so as to prevent an imbalance of the bladed rotor 22. In accordance with one set of embodiments this can be assured by using a temperature sensor 468 to either sense the temperature of the blades 26 directly, for example, using an optical pyrometer 468', or sensing some other temperature from which the temperature of the blades 26 can be predicted, for example, a temperature of the associated exhaust gases 18.2. Accordingly, when the temperature of the blades 26 is above a threshold, the associated control valves 37, 132 can be controlled to regulate the relative amount of fuel 12 supplied to the first fuel distribution circuit 128, for example, so as to provide for regulating the temperature of the blades 26.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A bladed rotor for use in a gas turbine engine, comprising:

a. a rotor, wherein said rotor is configured to be operatively coupled to or a part of a hollow shaft assembly of the as turbine engine, and during operation of said gas turbine engine, said rotor rotates with said hollow shaft assembly about a common axis of rotation of said gas turbine engine;
b. a rotary fluid trap comprising at least one net port, a trap portion, and an outlet port, each of which rotate with the bladed rotor during operation of said gas turbine engine, wherein at least one of said at least one net port is in fluid communication with a source of liquid fuel from an interior portion of said hollow shaft assembly;
c. an aft cavity, wherein said aft cavity is in fluid communication with said outlet port of said rotary fluid trap, said aft cavity is aft of a medial plane of said rotor; and said medial plane is transverse to said common axis of rotation and is medial with respect to forward and aft sides of said rotor;
d. a sharp edge on an inside surface of said aft cavity over which said liquid fuel flows during operation of said gas turbine engine, so as to provide for atomization of said liquid fuel flowing thereover during operation of said gas turbine engine;
e. a forward cavity, wherein said forward cavity is forward of said medial plane of said rotor;
f. a plurality of hollow blades arranged along a periphery of said rotor; wherein each hollow blade of said plurality of hollow blades comprises:
  i. a blade inlet duct, wherein said blade inlet duct provides for fluid communication between said aft cavity and an aft hollow interior portion of said hollow blade;
  ii. a radially-extending central rib within and generally circumferentially across a hollow interior of said hollow blade and between opposing sides of said hollow blade that partitions said hollow interior of said hollow blade into said aft hollow interior portion and a forward hollow interior portion, wherein said forward hollow interior portion of said hollow blade is internally adjacent to a leading edge of said hollow blade, said aft hollow interior portion of said hollow blade is internally adjacent to a trailing edge of said hollow blade; a radially-inboard portion of said radially-extending central rib is continuous with a rim portion of said rotor within a hoop portion of said hollow blade, and a radial extent of said radially-extending central rib is less than a corresponding radial extent of said hollow interior of said hollow blade so as to provide a corresponding radially-extending gap therebetween that provides for fluid communication between said aft and forward hollow interior portions of said hollow blade;
  iii. an opening in said radially-extending central rib located radially outboard of said hoop portion of said hollow blade, wherein said opening in said radially-extending central rib provides for fluid communication between said aft and forward hollow interior portions of said hollow blade; and
  iv. a blade outlet duct, wherein said blade outlet duct provides for fluid communication between said forward hollow interior portion of said hollow blade and said forward cavity; and
g. a rotor outlet duct, wherein said rotor outlet duct is in fluid communication with said forward cavity and provides for discharging said fuel from a radially-inboard portion thereof during operation of said gas turbine engine.

2. A bladed rotor for use in a gas turbine engine as recited in claim 1, wherein for at least one radial cross-section of said trap portion of said rotary fluid trap, every point in said at least one radial cross-section is radially further distant from said axis of rotation than every point in an inlet to said at least one inlet port and an outlet from said outlet port so that during rotation of said rotary fluid trap during operation of said gas turbine engine, a portion of said liquid fuel supplied to said rotary fluid trap is retained within said trap portion responsive to the action of associated centrifugal forces.

3. A bladed rotor for use in a gas turbine engine as recited in claim 1, wherein said at least one inlet port comprises at least first and second inlet ports, said first inlet port is in fluid communication with said source of liquid fuel from an interior portion of said hollow shaft assembly, and when installed in said gas turbine engine, said second inlet port is in fluid communication with a cavity containing a bearing that supports said hollow shaft assembly and through which a portion of said liquid fuel is directed so as to provide for cooling said bearing during operation of said gas turbine engine.

4. A bladed rotor for use in a gas turbine engine as recited in claim 1, wherein said aft cavity is bounded between an aft surface of said rotor and a forward surface of an aft cover plate, and a periphery of said aft cover plate is sealed at an aft rim portion of said rotor.

5. A bladed rotor for use in a gas turbine engine as recited in claim 4, wherein said periphery of said aft cover plate is welded to said aft rim portion of said rotor.

6. A bladed rotor for use in a gas turbine engine as recited in claim 4, wherein a radially-central portion of said aft cover plate is axially supported from a portion of said hollow shaft assembly of said gas turbine engine.

7. A bladed rotor for use in a gas turbine engine as recited in claim 6, wherein said rotary fluid trap is incorporated in said hollow shaft assembly of said gas turbine engine, and said radially-central portion of said aft cover plate is axially supported from a portion of said rotary fluid trap by at least one dowel within and extending across said outlet port of said rotary fluid trap.

8. A bladed rotor for use in a gas turbine engine as recited in claim 1, wherein said aft cavity comprises an axially-aftward-extending hollow interior portion proximate to an aft rim portion of said rotor, wherein said axially-aftward-extending hollow interior portion is in fluid communication with said aft cavity, further comprising at least one labyrinth seal element located on an exterior of a wall portion that bounds said axially-aftward-extending hollow interior portion of said aft cavity.

9. A bladed rotor for use in a gas turbine engine as recited in claim 1, wherein said sharp edge undercuts said inside surface of said aft cavity and defines a circumferential local radial extremum.

10. A bladed rotor for use in a gas turbine engine as recited in claim 1, wherein said inside surface of said aft cavity is forward facing on an aft side of said aft cavity, and a portion of said inside surface of said aft cavity radially-inward of said sharp edge is a sloped surface that is sloped aftward so that a radially-inward portion of said sloped surface of said aft cavity radially inward of said sharp edge is aftward of said sharp edge.

11. A bladed rotor for use in a gas turbine engine as recited in claim 1, wherein said forward cavity is bounded between a forward surface of said rotor and an aft surface of a forward cover plate, and a periphery of said forward cover plate is sealed at a forward rim portion of said rotor.

12. A bladed rotor for use in a gas turbine engine as recited in claim 11, wherein said periphery of said forward cover plate is welded to said forward rim portion of said rotor.

13. A bladed rotor for use in a gas turbine engine as recited in claim 1, wherein said forward cavity comprises an axially-forward-extending hollow interior portion proximate to a forward rim portion of said rotor, wherein said axially-forward-extending hollow interior potion is in fluid communication with said forward cavity, further comprising at least one labyrinth seal element located on an exterior of a wall portion that bounds said axially-forward-extending hollow interior portion of said forward cavity.

14. A bladed rotor for use in a gas turbine engine as recited in claim 1, wherein a radially-medial portion of said forward cavity incorporates a plurality of radially-extending guide vanes radially outboard of said rotor outlet duct, wherein said plurality of radially-extending guide vanes provide for imposing a forced vortex flow on said fuel in an atomized, vaporous or gaseous state flowing through said forward cavity during operation of said gas turbine engine.

15. A bladed rotor for use in a gas turbine engine as recited in claim 14, wherein said plurality of radially-extending guide vanes provide for forming associated radially-extending channels therebetween that are substantially radially directed.

16. A bladed rotor for use in a gas turbine engine as recited in claim 14, wherein said plurality of radially-extending guide vanes provide for associated radially-extending channels therebetween that are swept in a direction of rotation of said gas turbine engine during operation thereof.

17. A bladed rotor for use in a gas turbine engine as recited in claim 14, wherein said plurality of radially-extending guide vanes provide for associated radially-extending channels therebetween that are swept in a direction that is opposite to a direction of rotation of said gas turbine engine during operation thereof.

18. A bladed rotor for use in a gas turbine engine as recited in claim 14, wherein said forward cavity is bounded between a forward surface of said rotor and an aft surface of a forward cover plate, a periphery of said forward cover plate is sealed at a forward rim portion of said rotor, and said plurality of radially-extending guide vanes are incorporated onto an aft surface of said forward cover plate.

19. A bladed rotor for use in a gas turbine engine as recited in claim 1, wherein a path of said blade inlet duct is contoured so that an exit portion thereof into said hollow interior of said hollow blade is more radially directed than an entrance portion thereof from said aft cavity, so as to provide for said fuel in an atomized, vaporous or gaseous state from said aft cavity to be directed at least partially axially aftwards from said aft cavity into said blade inlet duct, and at least partially radially outward into an aft hollow interior portion of said hollow blade from said blade inlet duct, during the operation of said gas turbine engine.

20. A bladed rotor for use in a gas turbine engine as recited in claim 19, wherein said path of said blade inlet duct is contoured so as to provide for said fuel in said atomized, vaporous or gaseous state from said aft cavity to be directed substantially radially outward into an aft hollow interior portion of said hollow blade during the operation of said gas turbine engine.

21. A bladed rotor for use in a gas turbine engine as recited in claim 1, wherein said opening in said radially-extending central rib is radially proximate to said hoop portion of said hollow blade.

22. A bladed rotor for use in a gas turbine engine as recited in claim 1, wherein said opening in said radially-extending central rib is elliptically shaped, for which an associated major axis thereof is generally oriented in a radial direction.

23. A bladed rotor for use in a gas turbine engine as recited in claim 1, wherein a path of said blade outlet duct is contoured so that an entrance portion thereof from said forward hollow interior portion is more radially directed than an exit portion thereof into said forward cavity, so as to provide for said fuel in an atomized, vaporous or gaseous state from said forward hollow interior portion of said hollow blade to be directed at least partially radially inward into said blade outlet duct and from said blade outlet duct at least partially axially aftward into said forward cavity during the operation of said gas turbine engine.

24. A bladed rotor for use in a gas turbine engine as recited in claim 1, wherein each said hollow blade of said plurality of hollow blades further comprises at least one first transverse rib within and generally circumferentially across said aft hollow interior portion of said hollow blade and between corresponding opposing sides of said hollow blade.

25. A bladed rotor for use in a gas turbine engine as recited in claim 24, wherein a radially-inboard end of said at least one first transverse rib extends into an exit portion of a corresponding blade inlet duct.

26. A bladed rotor for use in a gas turbine engine as recited in claim 1, wherein each said hollow blade of said plurality of hollow blades further comprises at least one second transverse rib within and generally circumferentially across said forward hollow interior portion of said hollow blade and between corresponding opposing sides of said hollow blade.

27. A bladed rotor for use in a gas turbine engine as recited in claim 26, wherein a radially-inboard end of said at least one second transverse rib extends into an entrance portion of a corresponding blade outlet duct.

28. A bladed rotor for use in a gas turbine engine as recited in claim 24, wherein each said hollow blade of said plurality of hollow blades further comprises at least one second transverse rib within and generally circumferentially across said forward hollow interior portion of said hollow blade and between corresponding opposing sides of said hollow blade, wherein said at least one first transverse rib is shorter in a radial dimension than said at least one second transverse rib.

29. A bladed rotor for use in a gas turbine engine as recited in claim 1, wherein each said hollow blade of said plurality of hollow blades further comprises:
  a. at least one first transverse rib within and generally circumferentially across said aft hollow interior portion of said hollow blade and between corresponding opposing sides of said hollow blade; and
  b. at least one second transverse rib within and generally circumferentially across said forward hollow interior portion of said hollow blade and between corresponding opposing sides of said hollow blade, wherein a radially-inboard portion of at least one of said at least one first transverse rib or said at least one second transverse rib is continuous with said rim portion of said rotor within said hoop portion of said hollow blade.

30. A bladed rotor for use in a gas turbine engine as recited in claim 1, wherein each said hollow blade of said plurality of hollow blades further comprises:
  a. at least one first transverse rib within and generally circumferentially across said aft hollow interior portion of said hollow blade and between corresponding opposing sides of said hollow blade; and b. at least one second transverse rib within and generally circumferentially across said forward hollow interior portion of said hollow blade and between corresponding opposing sides of said hollow blade, wherein a radial extent of at least one of said at least one first transverse rib or said at least one second transverse rib is less than a corresponding radial extent of said hollow interior of said hollow blade so as to provide a corresponding radially-extending gap therebetween that provides for fluid communication through said corresponding radially-extending gap.

31. A bladed rotor for use in a gas turbine engine as recited in claim 1, wherein each said hollow blade of said plurality of hollow blades further comprises a plurality of transverse pedestals located in a corresponding said aft hollow interior portion of said hollow blade, wherein each transverse pedestal of said plurality of transverse pedestals extends generally circumferentially across said aft hollow interior portion and between corresponding opposing sides of said hollow blade, in thermal communication with said corresponding opposing sides of said hollow blade.

32. A bladed rotor for use in a gas turbine engine as recited in claim 31, wherein said plurality of transverse pedestals are arranged within each said hollow blade in a plurality of columns, with a plurality of radially-separated said transverse pedestals within each column of said plurality of columns.

33. A bladed rotor for use in a gas turbine engine as recited in claim 1, wherein each said hollow blade of said plurality of hollow blades further comprises a plurality of blade-centric internally-peripheral ribs, wherein each blade-centric internally-peripheral rib of said plurality of blade-centric internally-peripheral ribs extends around at least a portion of a periphery of said hollow interior of said hollow blade and is peripheral with respect to a radial axis of said hollow blade, and said plurality of blade-centric internally-peripheral ribs are radially separated from one another within said hollow interior of said hollow blade.

34. A bladed rotor for use in a gas turbine engine as recited in claim 33, wherein said at least said portion of said periphery of said hollow interior of said hollow blade is on an interior of a suction side portion of said hollow blade.

35. A bladed rotor for use in a gas turbine engine as recited in claim 33, wherein said at least said portion of said periphery of said hollow interior of said hollow blade comprises an entire periphery of said hollow interior of said hollow blade for at least one said blade-centric internally-peripheral rib.

36. A bladed rotor for use in a gas turbine engine as recited in claim 11, wherein said rotor outlet duct is annularly located between a forward extension of said forward cover plate and either a forward extension of said rotor or a portion of said hollow shaft assembly.

* * * * *

UNITED STATES PATENT AND TRADEMARK OFFICE
CERTIFICATE OF CORRECTION

PATENT NO. : 9,464,527 B2
APPLICATION NO. : 14/212158
DATED : October 11, 2016
INVENTOR(S) : Robert S. Thompson, Jr. et al.

Figure 19:
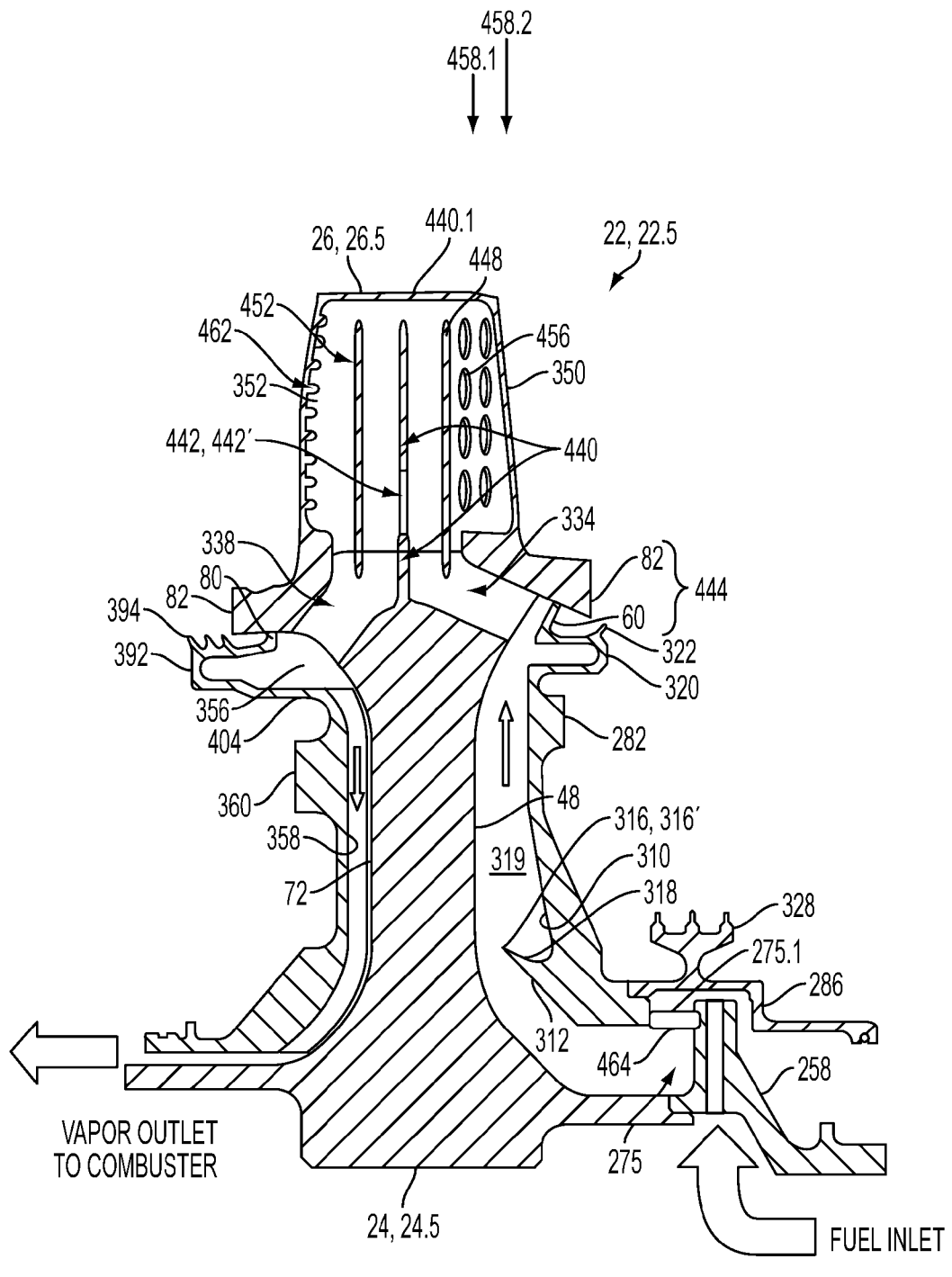
FIG. 19 illustrates a radial cross-section of a fifth embodiment of a bladed rotor.
Figure 20:
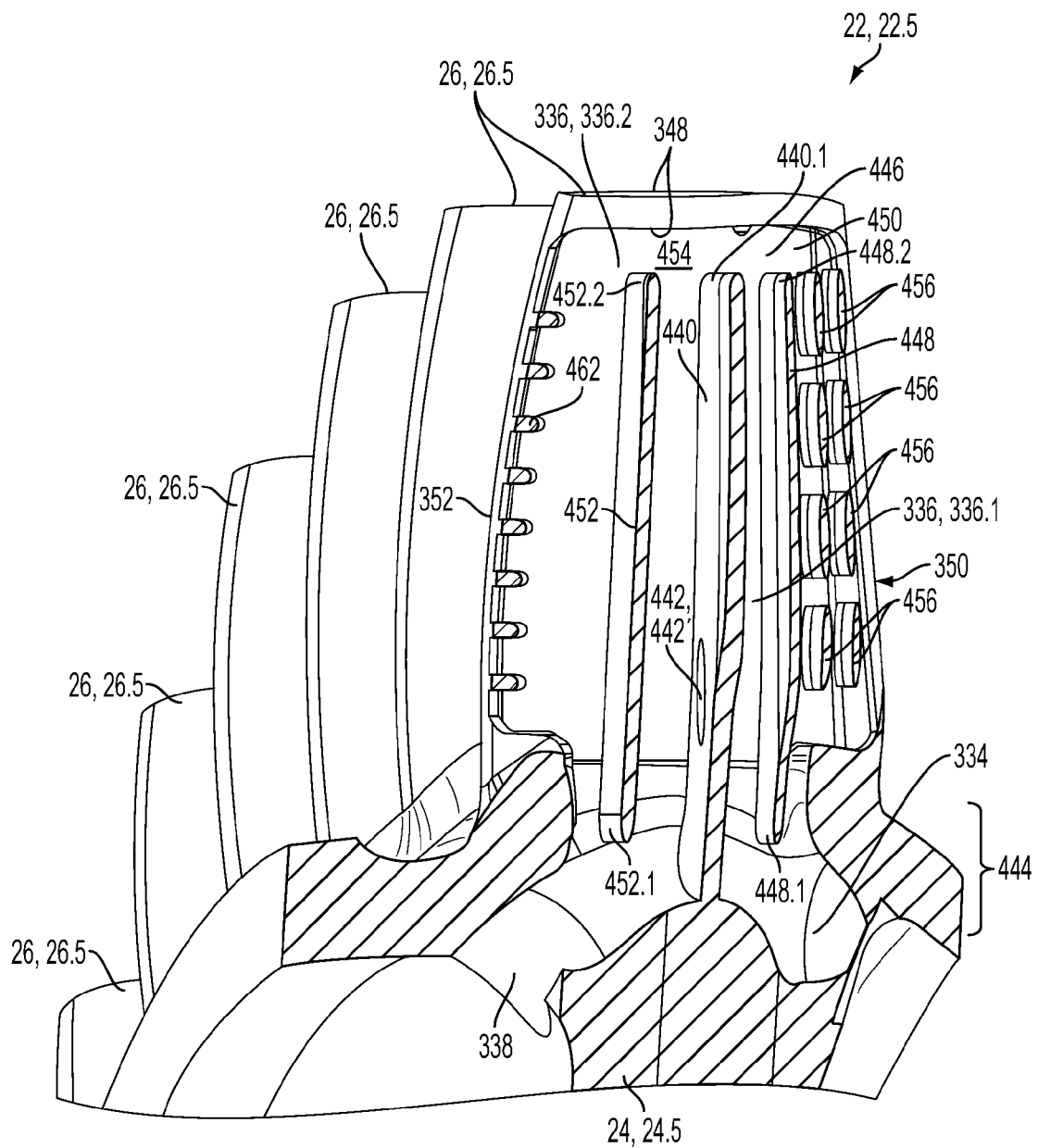
FIG. 20 illustrates a first fragmentary cross section of a portion of the fifth embodiment of a bladed rotor illustrated in FIG. 19, from an oblique perspective that is biased forward of a side view.
Figure 21:
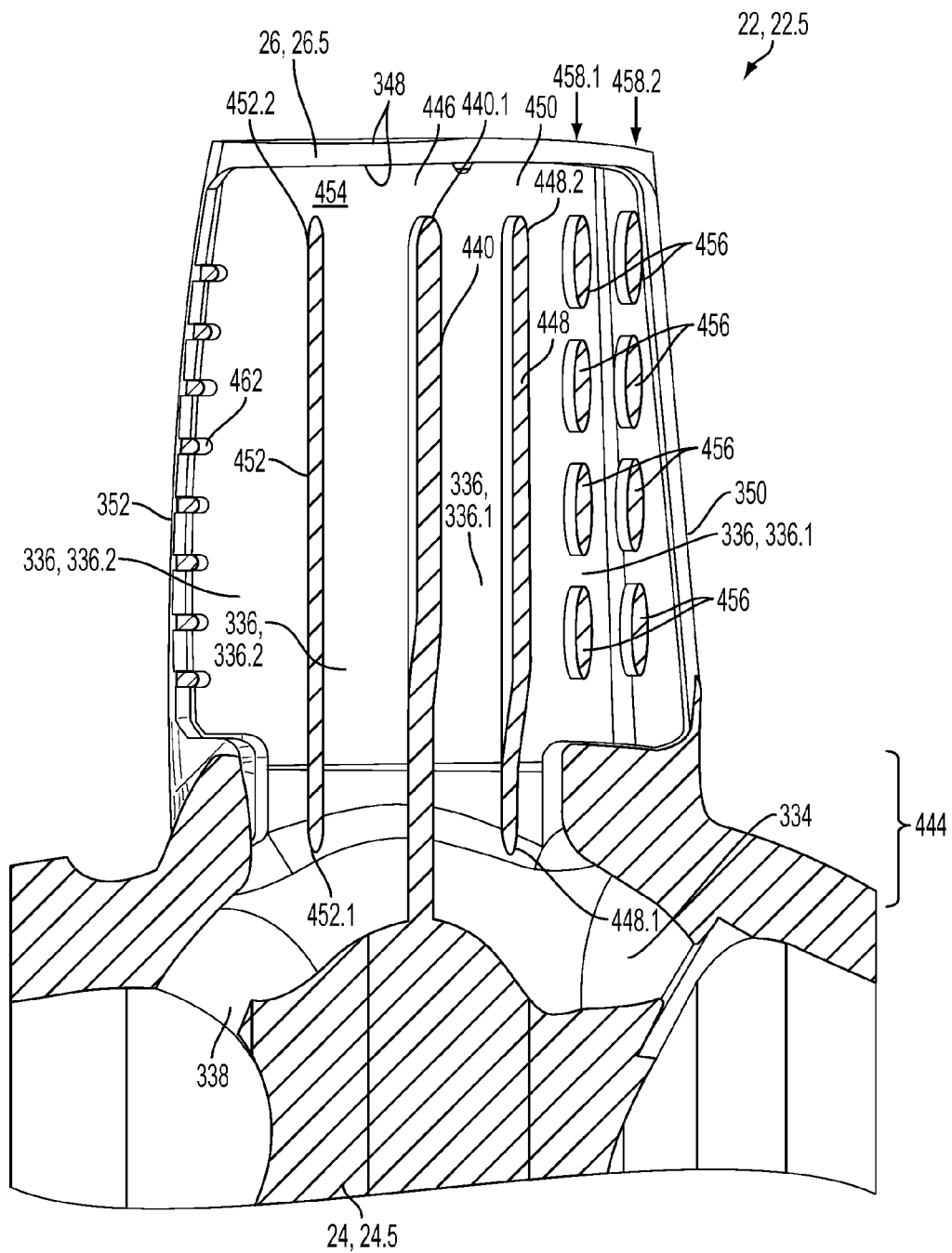
FIG. 21 illustrates a second fragmentary cross section of a portion of the fifth embodiment of a bladed rotor illustrated in FIG. 19, from a side view perspective.
Figure 22:
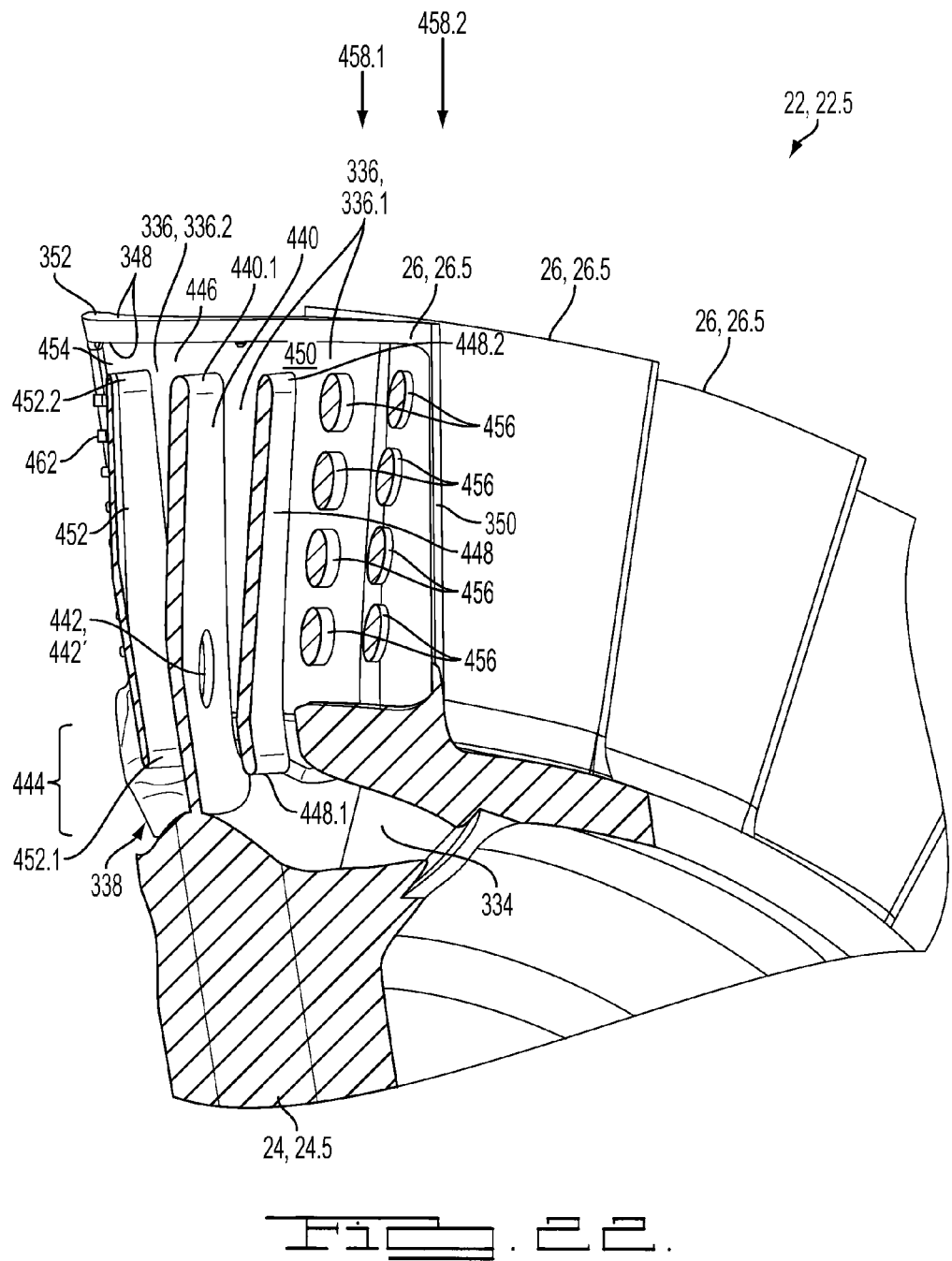
FIG. 22 illustrates a third fragmentary cross section of a portion of the fifth embodiment of a bladed rotor illustrated in FIG. 19, from an oblique perspective that is biased aftwards of a side view.

It is certified that error appears in the above-identified patent and that said Letters Patent is hereby corrected as shown below:

In the Drawings:

In FIG. 1, a lead line should be drawn from reference sign "160" in the same manner as shown in FIGS. 7 and 8.
In FIG. 14, the unlabeled transverse partition located between transverse ribs 354.2 and 354.1 should be transversely partitioned to show an opening 342 spanned by cross-hatched portions of the associated partition 340. The opening should be identified with reference sign --342-- and an associated lead line, and the cross-hatched portions should each be identified with reference sign --340-- and an associated lead line.
In FIG. 19:
The lead line from reference sign 440.1 should be extended to the top end of central rib 440, per FIGS. 20-22;
The right-most reference sign "82" (proximate to reference sign 444) should be changed to --62--;
Reference sign --314-- together with a lead line should be added to identify the cylindrical surface (above reference sign "464"), as is illustrated in FIG. 13; and
Reference sign --272-- and an associated lead line should be added to identify the cylindrical flange portion 272, as is illustrated in FIG. 13.

In the Specification
Column 5, Line 39, a (--.--) should be inserted after "reference".
Column 10, Line 66, "from" should be changed to --for--.
Column 11, Line 30, a (--,--) should be inserted after "bushing 234".
Column 12, Line 15, "is" should be changed to --of--.
Column 14, Line 26, a (--,--) should be inserted after "passage 378".
Column 16, Line 47, "that" should be changed to --than--.
Column 18, Line 2, --the latter of-- should be inserted before "which".

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,464,527 B2

Column 19:
Line 11, ", from" should be changed to --from,--; and
Line 17, "that provides" should be changed to --, which provides--.
Column 20:
Line 30, "26.1 the" should be changed to --26.1, which--; and
Line 36, a (--,--) should be inserted after "therein".
Column 21:
Line 10, --together-- should be inserted after "machined";
Line 48, --48-- should be inserted after "aft surface"; and
Line 49, --310-- should be inserted after "forward surface".
Column 22:
Line 15, a (--,--) should be inserted after "embodiments"; and
Line 18, "sensing" should be changed to --sense--.

In the Claims

Column 23, Claim 1:
Line 3, "as" should be changed to --gas--; and
Lines 7 and 10, "net" should be changed to --inlet-- (two occurrences).
Column 25, Line 8, Claim 13, "potion" should be changed to --portion--.